United States Patent
Diorio

(10) Patent No.: US 8,587,411 B1
(45) Date of Patent: *Nov. 19, 2013

(54) RFID READERS CAUSING RFID TAGS TO BACKSCATTER MORE CODES

(71) Applicant: Impinj, Inc., Seattle, WA (US)

(72) Inventor: Christopher J. Diorio, Shoreline, WA (US)

(73) Assignee: Impinj, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/709,944

(22) Filed: Dec. 10, 2012

Related U.S. Application Data

(63) Continuation of application No. 13/423,256, filed on Mar. 18, 2012, now Pat. No. 8,390,431, and a continuation of application No. 12/112,832, filed on Apr. 30, 2008, now Pat. No. 8,174,367.

(51) Int. Cl.
*H04Q 5/22* (2006.01)
*G08B 13/14* (2006.01)
*G06F 17/00* (2006.01)
*G06K 7/10* (2006.01)
*G06K 15/00* (2006.01)

(52) U.S. Cl.
USPC ....... 340/10.1; 340/10.2; 340/10.3; 340/10.4; 340/10.5; 340/572.2; 340/572.4; 340/572.7; 235/375; 235/376; 235/377; 235/378

(58) Field of Classification Search
None
See application file for complete search history.

(56) References Cited

U.S. PATENT DOCUMENTS 8,174,367 B1 * 5/2012 Diorio .................. 340/10.4
8,390,431 B1 * 3/2013 Diorio .................. 340/10.4

* cited by examiner

*Primary Examiner* — George Bugg
*Assistant Examiner* — Renee Dorsey
(74) *Attorney, Agent, or Firm* — Turk IP Law, LLC

(57) ABSTRACT

RFID reader systems, readers, components, software and methods cause RFID tags to backscatter a combination made from at least portions of a first code and a second code, without transmitting any commands in the interim. The first and/or second codes may include a tag response to a reader challenge. In a number of embodiments, a separate command does not have to be sent for reading the second code along with the first code, thereby saving time in inventorying the tags. Plus, the combination can enable reading tag codes during tag manufacturing that are not otherwise readily available to read in the field. In some embodiments, the combination may further include one or more error-checking codes.

20 Claims, 17 Drawing Sheets

*RFID SYSTEM COMMUNICATION*

*RFID READER SYSTEM DETAIL*

RFID READER SYSTEM CONFIGURATION WITH
OPTIONAL LOCAL AND REMOTE COMPONENTS

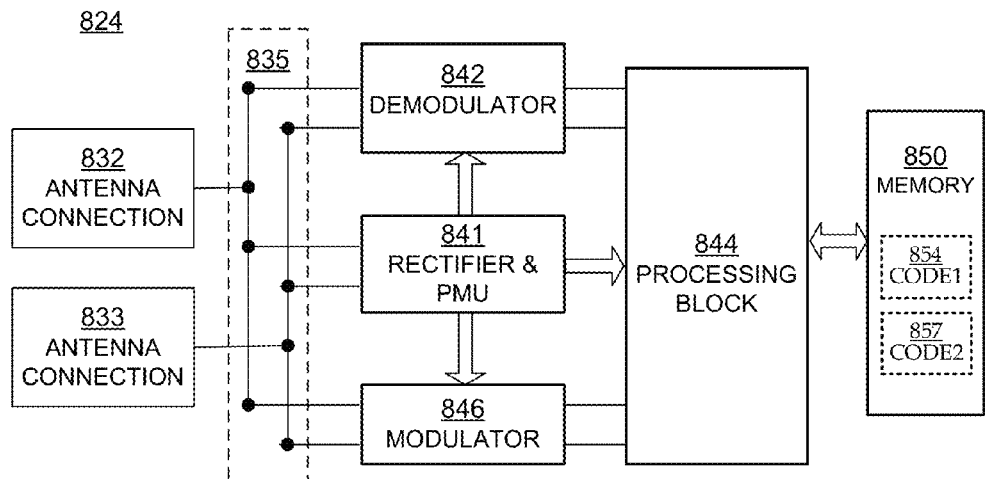
FIG. 8 *RFID TAG COMPONENTS*
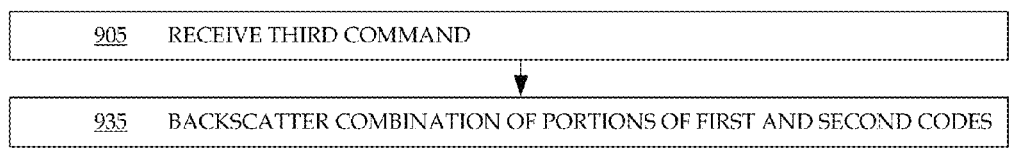
FIG. 9 *RFID TAG METHODS*
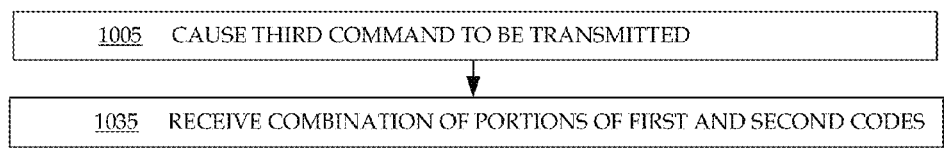
FIG. 10 *RFID READER SYSTEM COMPONENT METHODS*

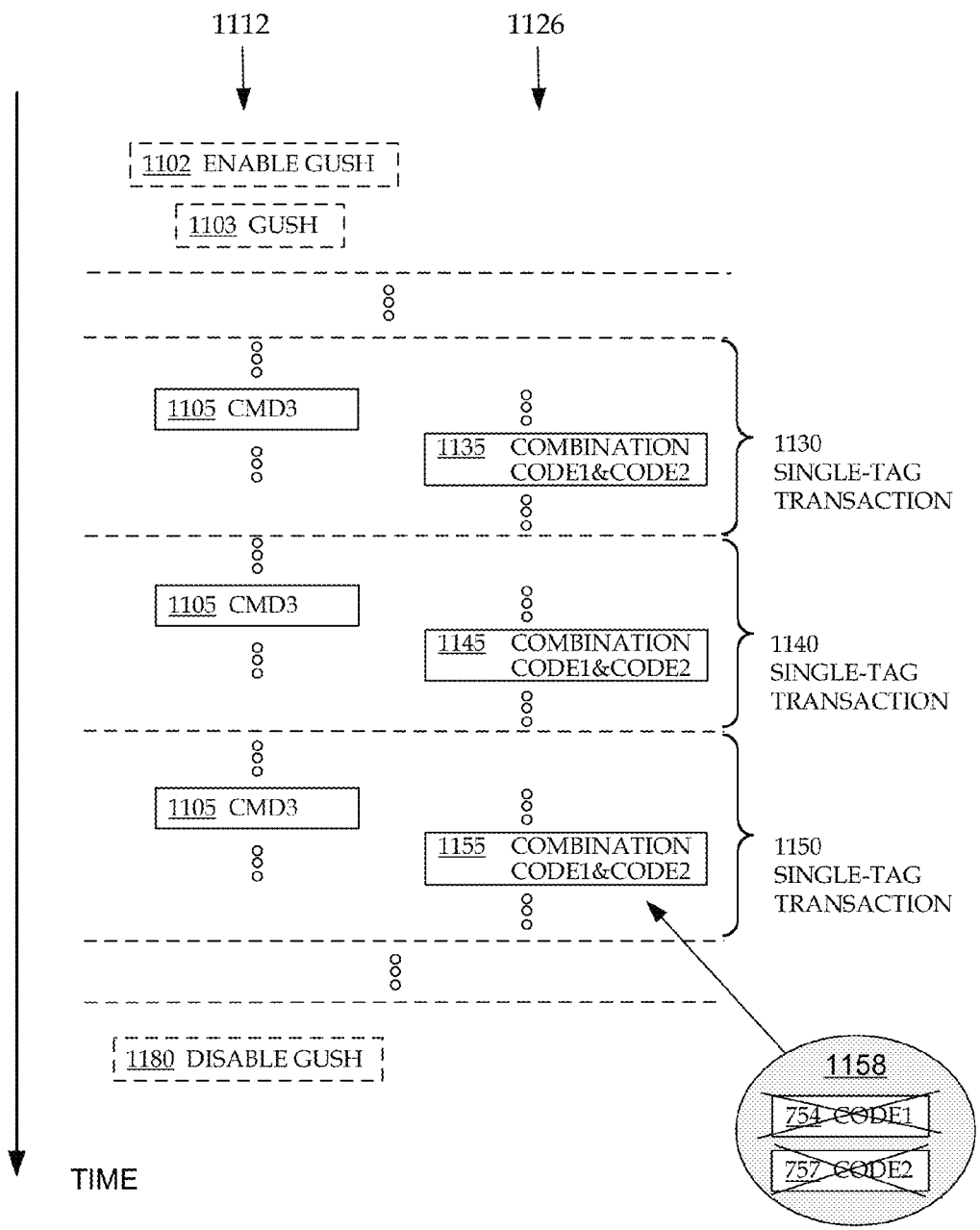
FIG. 11  *INVENTORYING POPULATION*

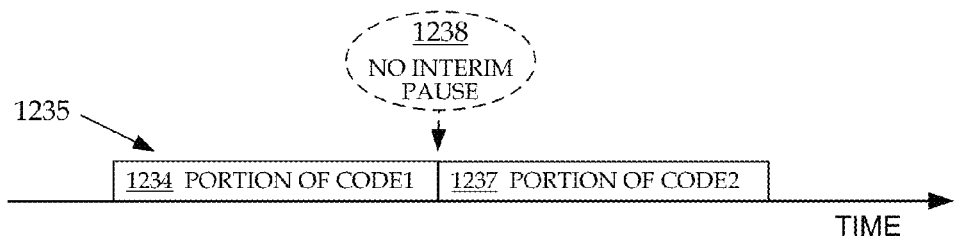
FIG. 12  *COMBINATION OF PORTIONS OF CODES*
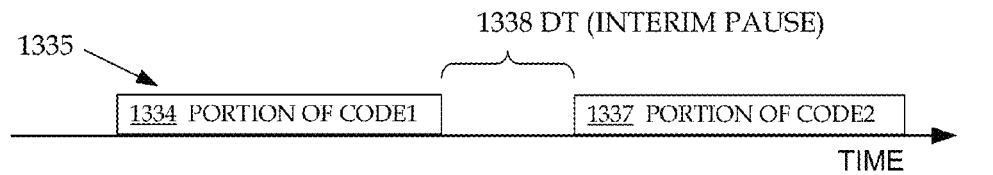
FIG. 13  *COMBINATION OF PORTIONS OF CODES*
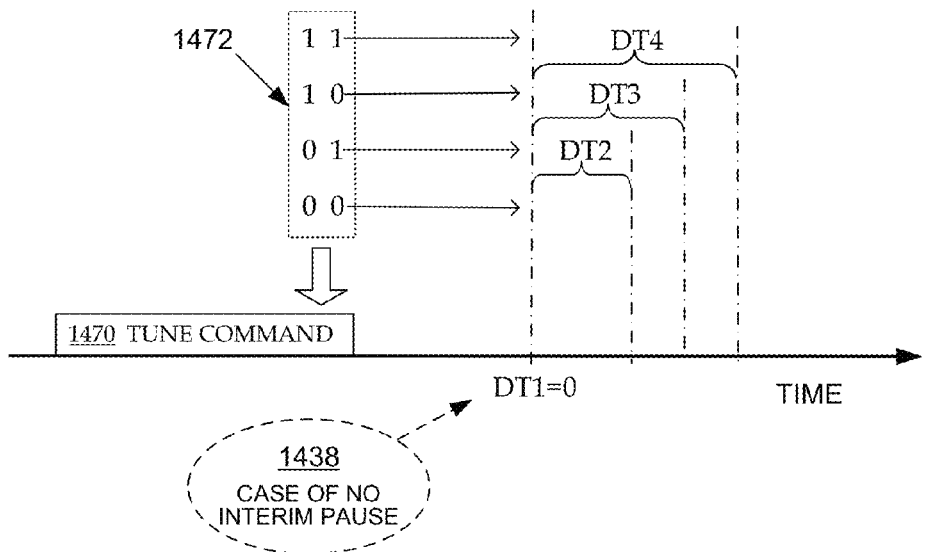
*TUNING OF DURATION OF INTERIM PAUSE*
FIG. 14

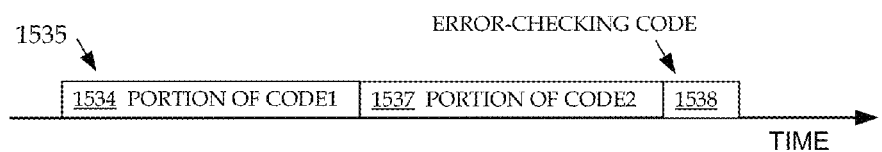
FIG. 15A  *COMBINATION OF PORTIONS OF CODES*
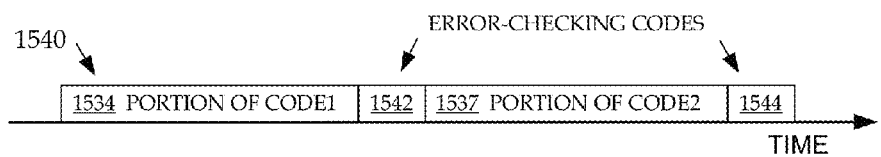
FIG. 15B  *COMBINATION OF PORTIONS OF CODES*

FIG. 16A

| ITEM | COMMAND | TARGET | ACTION | MEMBANK | POINTER | LENGTH | MASK | TRUNCATE | CRC-16 |
|---|---|---|---|---|---|---|---|---|---|
| # OF BITS | 4 | 3 | 3 | 2 | EBV | 8 | VARIABLE | 1 | 16 |
| DESCR. | 1010 | 000: Inventoried (S0)<br>001: Inventoried (S1)<br>010: Inventoried (S2)<br>011: Inventoried (S3)<br>100: SL<br>101: RFU<br>110: RFU<br>111: RFU | See Table 6.18 | 00: RFU<br>01: EPC<br>10: TID<br>11: User | Starting Mask address | Mask length (bits) | Mask value | 0: Disable truncation<br>1: Enable truncation | |

*TABLE 6.17 - SELECT COMMAND OF THE GEN2 SPEC VERSION 1.1.0*

FIG. 16B

| | | | | Mask | | | | |
|---|---|---|---|---|---|---|---|---|
| Membank | Pointer | Length | | FEF | | | FCF | |
| | | | Subfield_1 | ... | Subfield_N | Command code | | Data |
| # of bits: 2 | EBV | 8 | Variable | | Variable | 5 | | Variable |
| description: - | - | - | - | | - | - | | - |

*SUBDIVIDING THE MASK FIELD*

FIG. 16C

| | | | | Mask | | | | |
|---|---|---|---|---|---|---|---|---|
| Membank | Pointer | Length | | FEF | | | FCF | |
| | | | Class ID | MDID | Indicator | Command code | | Data |
| # of bits: 2 | EBV | 8 | 2 | 12 | 1 | 5 | | Variable |
| description: 10 | 06h | 14 | 10 | 000000000001 | 1 | 00000 | | - |

*EXAMPLE*

ARCHITECTURE OF INTERFACE CONVERTER WITH AGENT AND UTILITY

SAMPLE SCREENSHOT OF INTERFACE CONVERTER EXPOSING TO AGENT OPTIONS TO CONTROL FUNCTIONALITY OF TAG AUTHENTICATION UTILITY

RFID READERS CAUSING RFID TAGS TO BACKSCATTER MORE CODES

CROSS REFERENCE TO RELATED APPLICATIONS

This application is a Continuation of application Ser. No. 13/432,256, filed on Mar. 18, 2012, entitled "RFID TAGS THAT BACKSCATTER MORE CODES", the disclosure of which is hereby incorporated by reference for all purposes.

This application also claims priority from application Ser. No. 12/112,832, filed on Apr. 8, 2008, entitled "CAUSING RFID TAGS TO BACKSCATTER MORE CODES", through the application Ser. No. 13/432,256. The disclosure of the application Ser. No. 12/112,832 is hereby incorporated by reference for all purposes.

This application incorporates by reference commonly assigned U.S. Pat. No. 8,134,451, published on Mar. 13, 2012, entitled "RFID TAG CHIPS AND TAGS CAPABLE OF BACKSCATTERING MORE CODES AND METHODS", in its entirety.

FIELD OF THE INVENTION

The present description addresses the field of Radio Frequency IDentification (RFID) systems, and more specifically to causing such systems to yield their data more expeditiously.

BACKGROUND

Radio-Frequency Identification (RFID) systems typically include RFID readers, also known as RFID reader/writers or RFID interrogators, and RFID tags. RFID systems can be used in many ways for locating and identifying objects to which the tags are attached. RFID systems are particularly useful in product-related and service-related industries for tracking objects being processed, inventoried, or handled. In such cases, an RFID tag is usually attached to an individual item, or to its package.

RFID techniques entail using an RFID reader to interrogate one or more RFID tags. The reader transmitting a Radio Frequency (RF) wave performs the interrogation. The RF wave is typically electromagnetic, at least in the far field. The RF wave can also be predominantly electric or magnetic in the near field. The RF wave may encode one or more commands that instruct the tags to perform one or more actions.

A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected-back RF wave may encode data stored in the tag, such as a number. The response is demodulated and decoded by the reader, which thereby identifies, counts, or otherwise interacts with the associated item. The decoded data can denote a serial number, a price, a date, a time, a destination, an encrypted message, an electronic signature, other attribute(s), any combination of attributes, and so on. The data items are sometimes known as codes. Accordingly, when a reader receives tag data (codes) it can learn about the item that hosts the tag and/or about the tag itself.

An RFID tag typically includes an antenna system, a radio section, a power management section, and frequently a logical section, a memory, or both. In some RFID tags the logical section may include a cryptographic algorithm which, in many instances, relies on one or more passwords or keys stored in tag memory. In earlier RFID tags the power management section included an energy storage device such as a battery. RFID tags with an energy storage device are known as battery-assisted, semi-active, or active tags. Advances in semiconductor technology have miniaturized the electronics so much that an RFID tag can be powered solely by the RF signal it receives. Such RFID tags do not include an energy storage device and are called passive tags. Of course, even passive tags typically include temporary energy- and data/flag-storage elements such as capacitors or inductors.

A well-known problem in RFID systems is speed in reading the tags, especially when the reader reads more than one code from each tag. The problem is exacerbated if there are many tags, or if the host items are moving and thus allow only limited time to read their tags.

BRIEF SUMMARY

The invention improves over the prior art.

Briefly, the present invention provides RFID tags and integrated circuits (ICs) for RFID tags that store a first code and a second code in memory. The tags are capable of backscattering a combination of at least portions of the first code and the second code, without receiving any commands in the interim. The present invention also provides RFID reader systems, readers, components, software and methods for causing RFID tags to backscatter the combination, without transmitting any commands in the interim.

In a number of embodiments, separate reader commands do not have to be sent for reading the first and the second codes. Not sending separate commands can save time in inventorying the tags. Plus, it can enable reading codes during tag manufacturing that are not otherwise readily available to read in the field.

These and other features and advantages of the invention will be better understood from the specification of the invention, which includes the following Detailed Description and accompanying Drawings.

BRIEF DESCRIPTION OF THE DRAWINGS

The following Detailed Description proceeds with reference to the accompanying Drawings, in which:

FIG. 8 is a block diagram of an implementation of an electrical circuit formed in an IC of the tag of FIG. 2.

FIG. 9 is a flowchart illustrating methods for a tag according to embodiments.

FIG. 10 is a flowchart illustrating methods for an RFID reader system component according to embodiments.

FIG. 11 is a timing diagram showing commands from an RFID reader and replies from a population of RFID tags for reading combinations of first and second codes of the tags according to embodiments.

FIG. 12 is a diagram illustrating an embodiment where a combination of FIG. 11 is made from at least a portion of the first code followed by at least a portion of the second code, without an interim pause between them.

FIG. 13 is a diagram illustrating an embodiment where a combination of FIG. 11 is made from at least a portion of the first code followed by at least a portion of the second code, but with an interim pause between them.

FIG. 14 is a conceptual diagram for illustrating how an amount of the interim pause of the embodiment of FIG. 13 can be further tuned according to embodiments.

FIGS. 15A-B are conceptual diagrams depicting a combination of FIG. 11 made from at least a portion of the first code, a portion of the second code, and at least one error-checking code.

FIG. 16A is a table illustrating the fields of the Select command of the Gen2 Specification version 1.1.0, versions of which may be used as any one or more of the commands from an RFID reader system component according to embodiments.

FIG. 16B is a table illustrating how a number of custom commands can be enabled in a reader and a tag.

FIG. 16C is a table showing sample values that can be used for the table of FIG. 15B.

DETAILED DESCRIPTION

Figure 1:
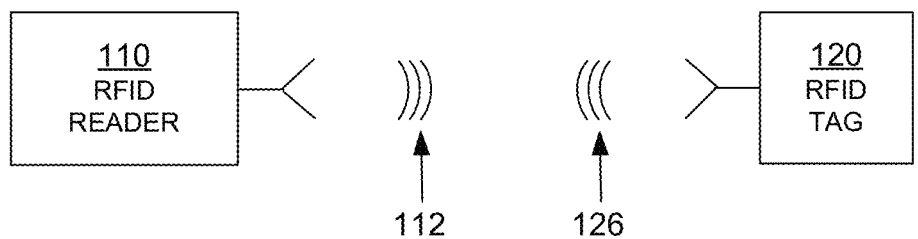
FIG. 1 is a block diagram of components of an RFID system.

The present invention is now described in more detail. While it is disclosed in its preferred form, the specific embodiments of the invention as disclosed herein and illustrated in the drawings are not to be considered in a limiting sense. Rather, these embodiments are provided so that this disclosure will be thorough and complete, and will fully convey the scope of the invention to those skilled in the art. Indeed, it should be readily apparent in view of the present description that the invention may be modified in numerous ways. Among other things, the present invention may be embodied as devices, methods, software, and so on. Accordingly, the present invention may take the form of an entirely hardware embodiment, an entirely software embodiment, an entirely firmware embodiment, or an embodiment combining aspects of the above. This description is, therefore, not to be taken in a limiting sense.

FIG. 1 is a diagram of components of a typical RFID system 100, incorporating aspects of the invention. An RFID reader 110 transmits an interrogating Radio Frequency (RF) wave 112. RFID tag 120 in the vicinity of RFID reader 110 may sense interrogating RF wave 112, and generate wave 126 in response. RFID reader 110 senses and interprets wave 126.

Reader 110 and tag 120 exchange data via wave 112 and wave 126. In a session of such an exchange each encodes, modulates, and transmits data to the other, and each receives, demodulates, and decodes data from the other. The data is modulated onto, and demodulated from, RF waveforms.

Encoding the data in waveforms can be performed in a number of different ways. For example, protocols are devised to communicate in terms of symbols, also called RFID symbols. A symbol for communicating can be a delimiter, a calibration symbol, and so on. Further symbols can be implemented for ultimately exchanging binary data, such as "0" and "1", if that is desired. In turn, when the waveforms are processed internally by reader 110 and tag 120, they can be equivalently considered and treated as numbers having corresponding values, and so on.

Tag 120 can be a passive tag or an active or semi-active tag, i.e. having its own power source. Where tag 120 is a passive tag, it is powered from wave 112.

Figure 2:
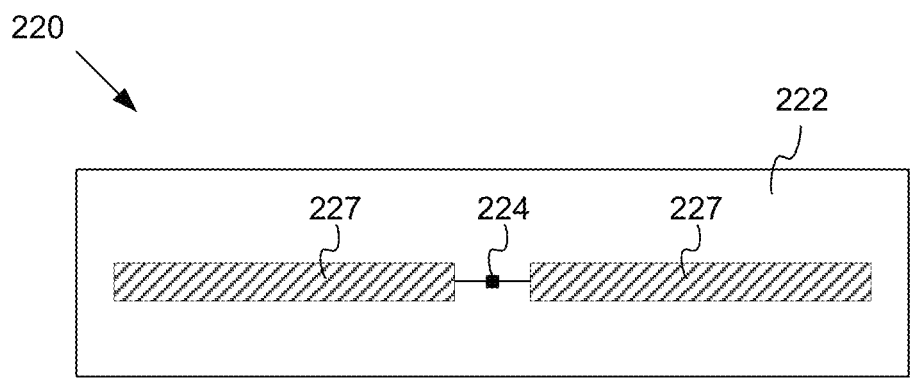
FIG. 2 is a diagram showing components of a passive RFID tag, such as a tag that can be used in the system of FIG. 1.

FIG. 2 is a diagram of an RFID tag 220, which can be the same as tag 120 of FIG. 1. Tag 220 is implemented as a passive tag, meaning it does not have its own power source. Much of what is described in this document, however, applies also to active tags.

Tag 220 is often formed on a substantially planar inlay 222, which can be made in many ways known in the art. Tag 220 includes an electrical circuit, which is preferably although not necessarily implemented as an integrated circuit (IC) 224. IC 224 is arranged on inlay 222.

Tag 220 also includes an antenna for exchanging wireless signals with its environment. The antenna is often flat and attached to inlay 222. IC 224 is electrically coupled to the antenna via suitable antenna ports (not shown in FIG. 2).

The antenna may be made in a number of ways, as is well known in the art. In the example of FIG. 2, the antenna is made from two distinct antenna segments 227, which are shown here forming a dipole. Many other embodiments are possible, using any number of antenna segments.

In some embodiments, an antenna can be made with even a single segment. Different points of the segment can be coupled to one or more of the antenna ports of IC 224. For example, the antenna can form a single loop, with its ends coupled to the ports. It should be remembered that, when the single segment has more complex shapes, even a single segment could behave like multiple segments, at the frequencies of RFID wireless communication.

In operation, a signal is received by the antenna and communicated to IC 224. IC 224 both harvests power, and responds if appropriate, based on the incoming signal and its internal state. When responding via backscatter, IC 224 modulates the reflectance of the antenna, which generates a backscatter signal from a wave transmitted by the reader. Coupling together and uncoupling the antenna ports of IC 224 can modulate the antenna reflectance, as can a variety of other means.

In the embodiment of FIG. 2, antenna segments 227 are separate from IC 224. In other embodiments, antenna segments may alternately be formed on IC 224, and so on.

The components of the RFID system of FIG. 1 may communicate with each other in any number of modes. One such mode is called full duplex. Another such mode is called half-duplex, and is described below.

Figure 3:
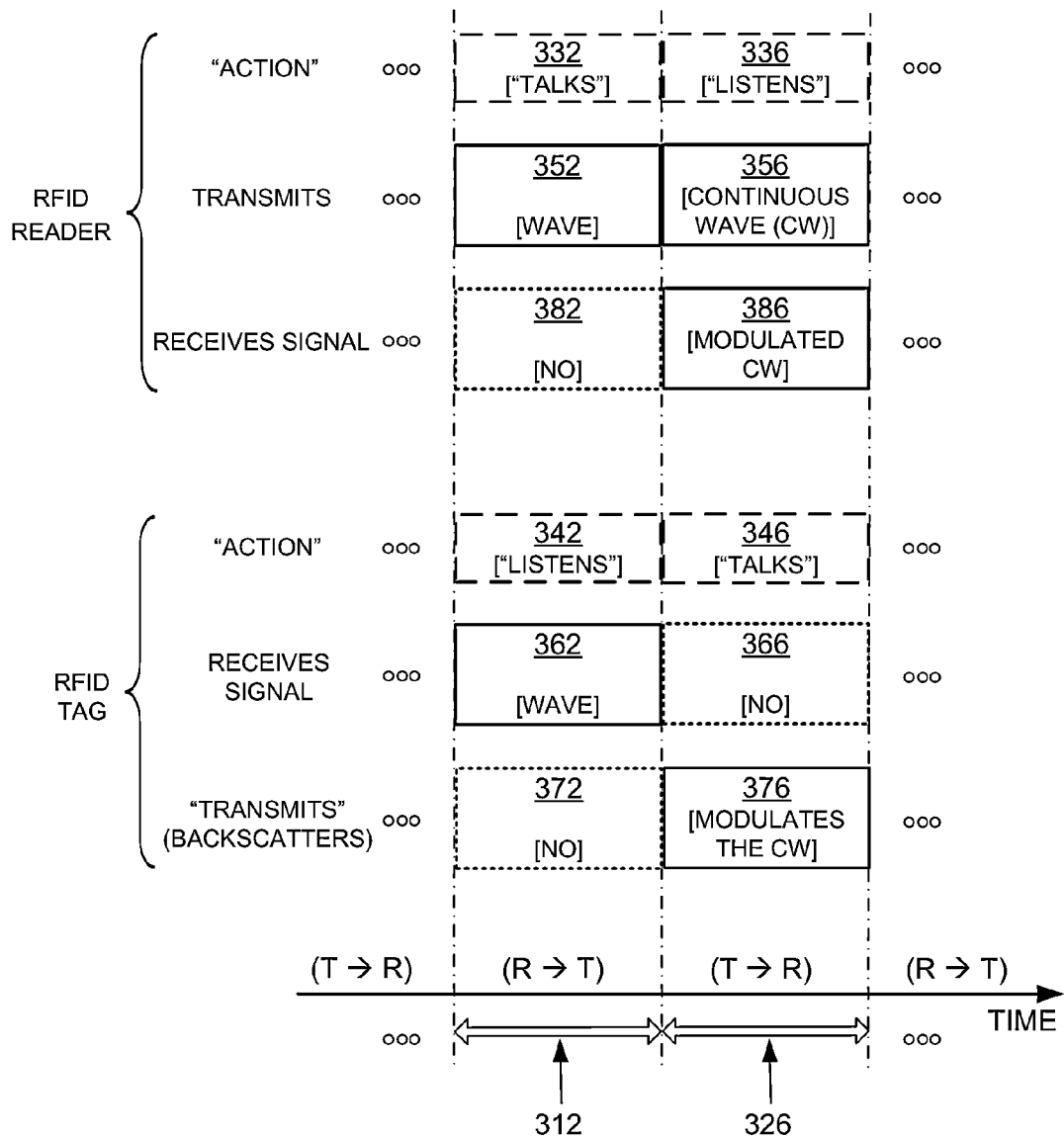
FIG. 3 is a conceptual diagram for explaining a half-duplex mode of communication between the components of the RFID system of FIG. 1.

FIG. 3 is a conceptual diagram 300 for explaining the half-duplex mode of communication between the components of the RFID system of FIG. 1, especially when tag 120 is implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326— here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual technical behavior, during interval 312, reader 110 talks to tag 120 as follows. According to block 352, reader 110 transmits wave 112, which was first described in FIG. 1. At the same time, according to block 362, tag 120 receives wave 112 and processes it, to extract data and so on. Meanwhile, according to block 372, tag 120 does not backscatter with its antenna, and according to block 382, reader 110 has no wave to receive from tag 120.

During interval 326, tag 120 talks to reader 110 as follows. According to block 356, reader 110 transmits a Continuous Wave (CW), which can be thought of as a carrier signal that ideally encodes no information. As discussed before, this carrier signal serves both to be harvested by tag 120 for its own internal power needs, and also as a wave that tag 120 can backscatter. Indeed, during interval 326, according to block 366, tag 120 does not receive a signal for processing. Instead, according to block 376, tag 120 modulates the CW emitted according to block 356, so as to generate backscatter wave 126. Concurrently, according to block 386, reader 110 receives backscatter wave 126 and processes it.

In the above, an RFID reader/interrogator may communicate with one or more RFID tags in any number of ways. Some such ways are described in protocols. A protocol is a specification that calls for specific manners of signaling between the reader and the tags.

One such protocol is called the Specification for RFID Air Interface-EPC™ Radio-Frequency Identity Protocols Class-1 Generation-2 UHF RFID Protocol for Communications at 860 MHz-960 MHz, which is also colloquially known as "the Gen2 Specification". The Gen2 Specification has been ratified by EPCglobal, which is an organization that maintains a website at: <http://www.gs1.org/epcglobal/> at the time this document is initially filed with the USPTO. Version 1.1.0 and Version 1.2.0 of the Gen2 Specification are hereby incorporated by reference in their entirety.

In addition, a protocol can be a variant of a stated specification such as the Gen2 Specification, for example including fewer or additional commands than the stated specification calls for, and so on. In such instances, additional commands are sometimes called custom commands.

Figure 4:
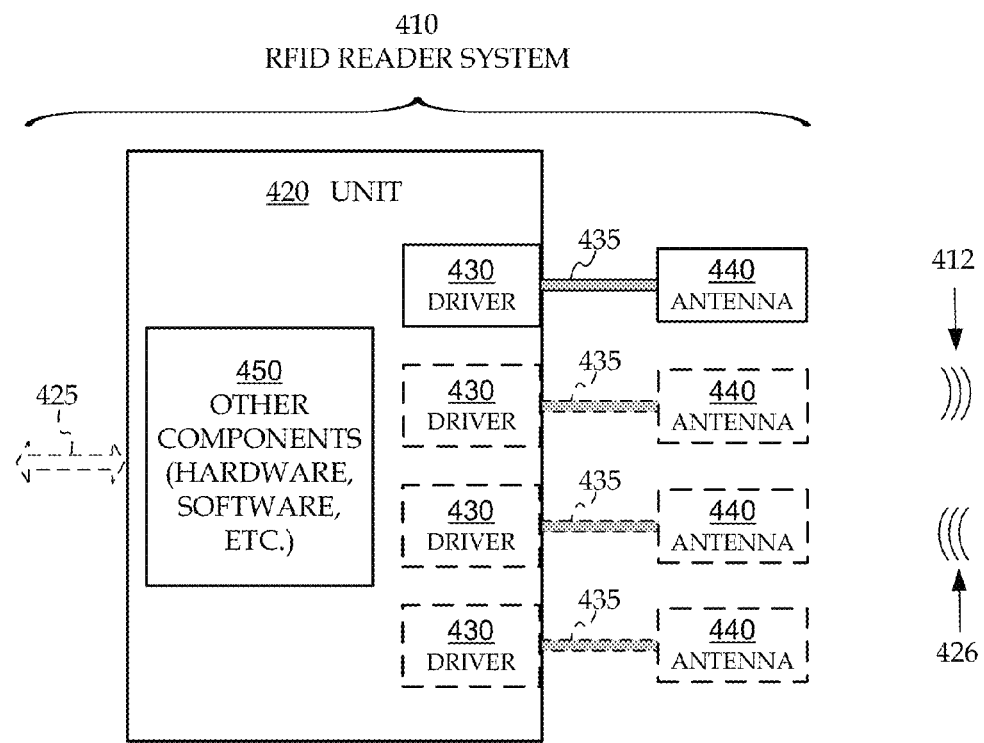
FIG. 4 is a block diagram showing a detail of an RFID reader system, such as the one shown in FIG. 1.

FIG. 4 is a block diagram showing a detail of an RFID reader system 410, which can be the same as reader 110 shown in FIG. 1. A unit 420 is also known as a reader 420, and has one or more antenna drivers 430. In some embodiments it has four drivers 430. For each driver 430 there is an output connector. Accordingly, connectors 435 can be attached to the outputs of the provided respective drivers 430, and then connectors 435 can be attached to respective antennas 440.

A driver 430 can send to its respective antenna 440 a driving signal that is in the RF range, which is why connector 435 is typically but not necessarily a coaxial cable. The driving signal causes the antenna 440 to transmit an RF wave 412, which is analogous to RF wave 112 of FIG. 1. In addition, RF wave 426 can be backscattered from the RFID tags, analogous to RF wave 126 of FIG. 1. Backscattered RF wave 426 is received by an antenna 440 and ultimately becomes a signal sensed by unit 420.

Unit 420 also has other components 450, such as hardware and/or software and/or firmware, which may be described in more detail later in this document. Components 450 control drivers 430, and as such cause RF wave 412 to be transmitted, and the sensed backscattered RF wave 426 to be interpreted. Optionally and preferably there is a communication link 425 to other equipment, such as computers and the like, for remote operation of reader system 410.

Figure 5:
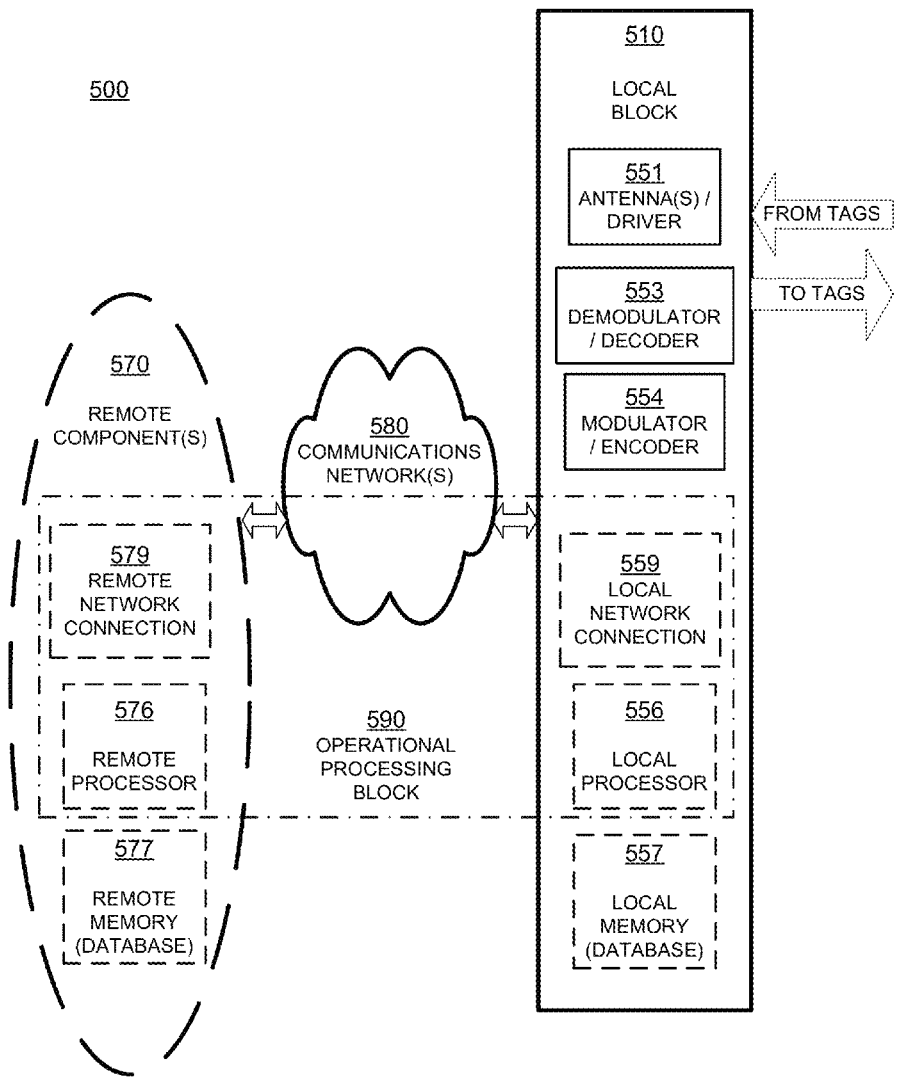
FIG. 5 is a block diagram of a whole RFID reader system according to embodiments.

FIG. 5 is a block diagram of a whole RFID reader system 500 according to embodiments. System 500 includes a local block 510, and optionally remote components 570. Local block 510 and remote components 570 can be implemented in any number of ways. It will be recognized that reader 110 of FIG. 1 is the same as local block 510, if remote components 570 are not provided. Alternately, reader 110 can be implemented instead by system 500, of which only the local block 510 is shown in FIG. 1. Plus, local block 510 can be unit 420 of FIG. 4.

Local block 510 is responsible for communicating with tags. Local block 510 includes a block 551 of an antenna and a driver of the antenna for communicating with the tags. Some readers, like that shown in local block 510, contain a single antenna and driver. Some readers contain multiple antennas and drivers and a method to switch signals among them, including sometimes using different antennas for transmitting and for receiving. And some readers contain multiple antennas and drivers that can operate simultaneously. A demodulator/decoder block 553 demodulates and decodes backscattered waves received from the tags via antenna block 551. Modulator/encoder block 554 encodes and modulates an RF wave that is to be transmitted to the tags via antenna block 551.

Local block 510 additionally includes an optional local processor 556. Processor 556 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer; programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases some or all of the decoding function in block 553, the encoding function in block 554, or both, may be performed instead by processor 556.

Local block 510 additionally includes an optional local memory 557. Memory 557 may be implemented in any number of ways known in the art. Such ways include, by way of examples and not of limitation, nonvolatile memories (NVM), read-only memories (ROM), random access memories (RAM), any combination of one or more of these, and so on. Memory 557, if provided, can include programs for processor 556 to run, if provided.

In some embodiments, memory 557 stores codes read from tags, or codes to be written to tags, such as Electronic Product Codes (EPCs), Tag Identifiers (TIDs), keys, hashes, and other data. Memory 557 can also include reference data that is to be compared to the codes, instructions and/or rules for how to encode commands for the tags, modes for controlling antenna 551, and so on. In some of these embodiments, local memory 557 is provided as a database.

Some components of local block 510 typically treat the data as analog, such as the antenna/driver block 551. Other components such as memory 557 typically treat the data as digital. At some point there is a conversion between analog and digital. Based on where this conversion occurs, a whole reader may be characterized as "analog" or "digital", but most readers contain a mix of analog and digital functionality.

If remote components 570 are indeed provided, they are coupled to local block 510 via an electronic communications network 580. Network 580 can be a Local Area Network (LAN), a Metropolitan Area Network (MAN), a Wide Area Network (WAN), a network of networks such as the internet, or a mere local communication link, such as a USB, PCI, and so on. In turn, local block 510 then includes a local network connection 559 for communicating with network 580.

There can be one or more remote component(s) 570. If more than one, they can be located at the same location, or in different locations. They can access each other and local block 510 via network 580, or via other similar networks, and so on. Accordingly, remote component(s) 570 can use respective remote network connections. Only one such remote network connection 579 is shown, which is similar to local network connection 559, etc.

Remote component(s) 570 can also include a remote processor 576. Processor 576 can be made in any way known in the art, such as was described with reference to local processor 556.

Remote component(s) 570 can also include a remote memory 577. Memory 577 can be made in any way known in the art, such as was described with reference to local memory 557. Memory 577 may include a local database, and a different database of a Standards Organization, such as one that can reference EPCs.

Of the above-described elements, it is advantageous to consider a combination of these components, designated as operational processing block 590. Block 590 includes those that are provided of the following: local processor 556, remote processor 576, local network connection 559, remote network connection 579, and by extension an applicable portion of network 580 that links connection 559 with connection 579. The portion can be dynamically changeable, etc. In addition, block 590 can receive and decode RF waves received via antenna driver 551, and cause antenna driver 551 to transmit RF waves according to what it has processed.

Block 590 includes either local processor 556, or remote processor 576, or both. If both are provided, remote processor 576 can be made such that it operates in a way complementary with that of local processor 556. In fact, the two can cooperate. It will be appreciated that block 590, as defined this way, is in communication with both local memory 557 and remote memory 577, if both are present.

Accordingly, block 590 is location agnostic, in that its functions can be implemented either by local processor 556, or by remote processor 576, or by a combination of both. Some of these functions are preferably implemented by local processor 556, and some by remote processor 576. Block 590 accesses local memory 557, or remote memory 577, or both for storing and/or retrieving data.

Reader system 500 operates by block 590 generating communications for RFID tags. These communications are ultimately transmitted by antenna driver block 551, with modulator/encoder block 554 encoding and modulating the information on an RF wave. Then data is received from the tags via antenna driver block 551, demodulated and decoded by demodulator/decoder block 553, and processed by processing block 590.

The invention additionally includes programs, and methods of operation of the programs. A program is generally defined as a group of steps or operations leading to a desired result, due to the nature of the elements in the steps and their sequence. A program is usually advantageously implemented as a sequence of steps or operations for a processor, such as the structures described above.

Performing the steps, instructions, or operations of a program requires manipulation of physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

The invention furthermore includes storage media. Such media, individually or in combination with others, have stored thereon instructions of a program made according to the invention. A storage medium according to the invention is a computer-readable medium, such as a memory, and is read by a processor of the type mentioned above. If a memory, it can be implemented in a number of ways, such as Read Only Memory (ROM), Random Access Memory (RAM), etc., some of which are volatile and some non-volatile.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary, or thought in terms of various interconnected distinct software modules.

This detailed description is presented largely in terms of flowcharts, algorithms, and symbolic representations of operations on data bits on and/or within at least one medium that allows computational operations, such as a computer with memory. Indeed, such descriptions and representations are the type of convenient labels used by those skilled in programming and/or the data-processing arts to effectively convey the substance of their work to others skilled in the art. A person skilled in the art of programming may use these descriptions to readily generate specific instructions for implementing a program according to the present invention.

Embodiments of an RFID reader system can be implemented as hardware, software, firmware, or any combination. It is advantageous to consider such a system as subdivided into components or modules. A person skilled in the art will recognize that some of these components or modules can be implemented as hardware, some as software, some as firmware, and some as a combination. An example of such a subdivision is now described, together with the RFID tag as an additional module.

Figure 6:
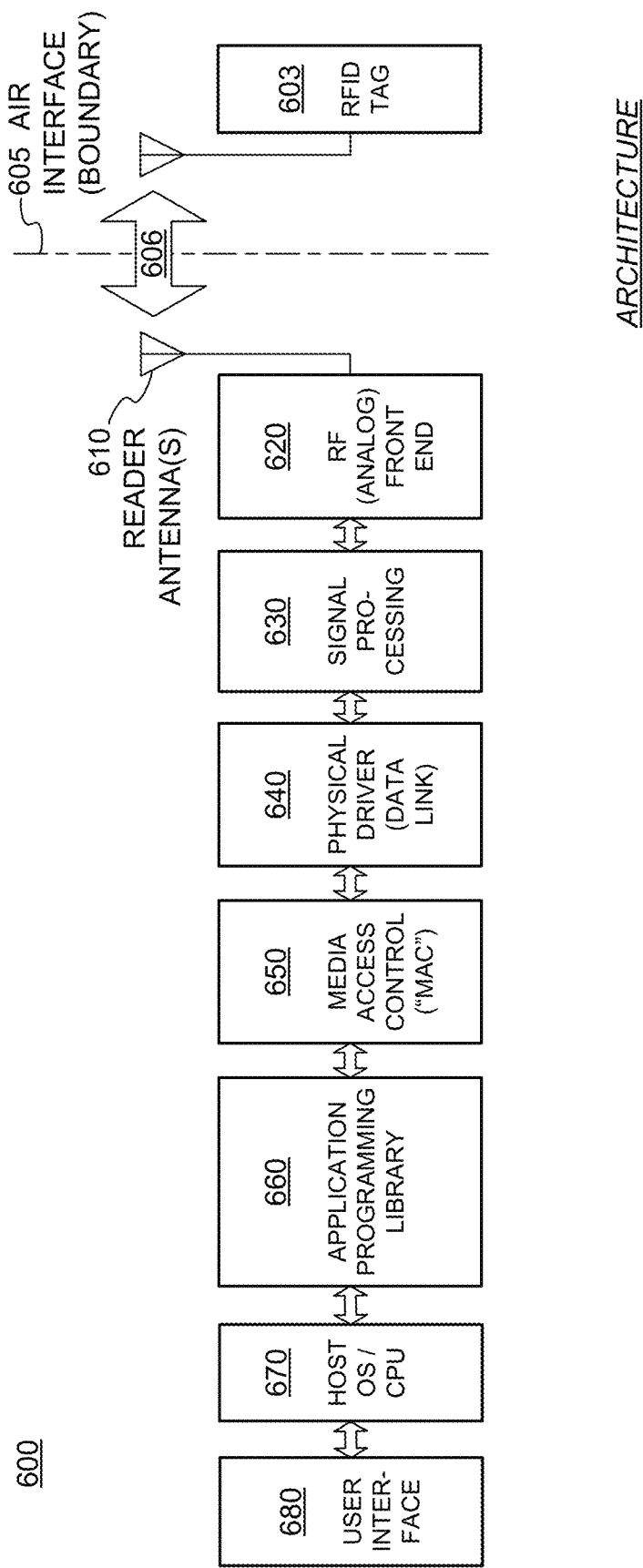
FIG. 6 is a block diagram illustrating an overall architecture of an RFID system according to embodiments.

FIG. 6 is a block diagram illustrating an overall architecture of an RFID system 600 according to embodiments. It will be appreciated that RFID system 600 is considered subdivided into modules or components. Each of these modules may be implemented by itself, or in combination with others. In addition, some of them may be present more than once. Other embodiments may be equivalently subdivided into different modules. It will be recognized that some aspects are parallel with what was described previously.

An RFID tag 603 is considered here as a module by itself. RFID tag 603 conducts a wireless communication 606 with the remainder, via the air interface 605. It is noteworthy that air interface 605 is really only a boundary, in that signals or data that pass through it are not intended to be transformed from one thing to another. Specifications as to how readers and tags are to communicate with each other, for example the Gen2 Specification, also properly characterize that boundary as an interface.

RFID system 600 includes one or more reader antennas 610, and an RF front-end module 620 for interfacing with reader antenna(s) 610. These can be made as described above.

RFID system 600 also includes a signal-processing module 630. In one embodiment, signal-processing module 630 exchanges waveforms with RF front-end module 620, such as I and Q waveform pairs.

RFID system 600 also includes a physical-driver module 640, which is also known as data-link module. In some embodiments physical-driver module 640 exchanges bits with signal-processing module 630. Physical-driver module 640 can be the stage associated with the framing of data.

RFID system 600 additionally includes a media access control module 650, which is also known as MAC layer module. In one embodiment, MAC layer module 650 exchanges packets of bits with physical driver module 640. MAC layer module 650 can make decisions for sharing the medium of wireless communication, which in this case is the air interface.

RFID system 600 moreover includes an application-programming library-module 660. This module 660 can include application programming interfaces (APIs), other objects, etc.

All of these RFID system functionalities can be supported by one or more processors. One of these processors can be considered a host processor. Such a host processor might include a host operating system (OS) and/or central processing unit (CPU), as in module 670. In some embodiments, the processor is not considered as a separate module, but one that includes some of the above-mentioned modules of RFID system 600. In some embodiments the one or more processors may perform operations associated with retrieving data that may include a tag public key, an electronic signature, a tag identifier, an item identifier, and a signing-authority public key. In some embodiments the one or more processors may verify an electronic signature, create a tag challenge, and verify a tag response.

User interface module 680 may be coupled to application-programming-library module 660, for accessing the APIs. User interface module 680 can be manual, automatic, or both. It can be supported by the host OS/CPU module 670 mentioned above, or by a separate processor, etc.

It will be observed that the modules of RFID system 600 form a chain. Adjacent modules in the chain can be coupled by appropriate instrumentalities for exchanging signals. These instrumentalities include conductors, buses, interfaces, and so on. These instrumentalities can be local, e.g. to connect modules that are physically close to each other, or over a network, for remote communication.

The chain is used in one direction for transmitting RFID waveforms and in the other direction for receiving RFID waveforms. In transmitting mode, waveform initiation can be in any one of the modules. Ultimately, signals are routed to reader antenna(s) 610 to be transmitted as wireless waves. In receiving mode, reader antenna(s) 610 receives wireless waves, which are in turn processed successively by the various modules in the chain. Processing can terminate in any one of the modules.

The architecture of RFID system 600 is presented for purposes of explanation, and not of limitation. Its particular, subdivision into modules need not be followed for creating embodiments. Furthermore, the features of the present disclosure can be performed either within a single one of the modules, or by a combination of them.

At this juncture, a prior art method of reading tag data is described.

Figure 7:
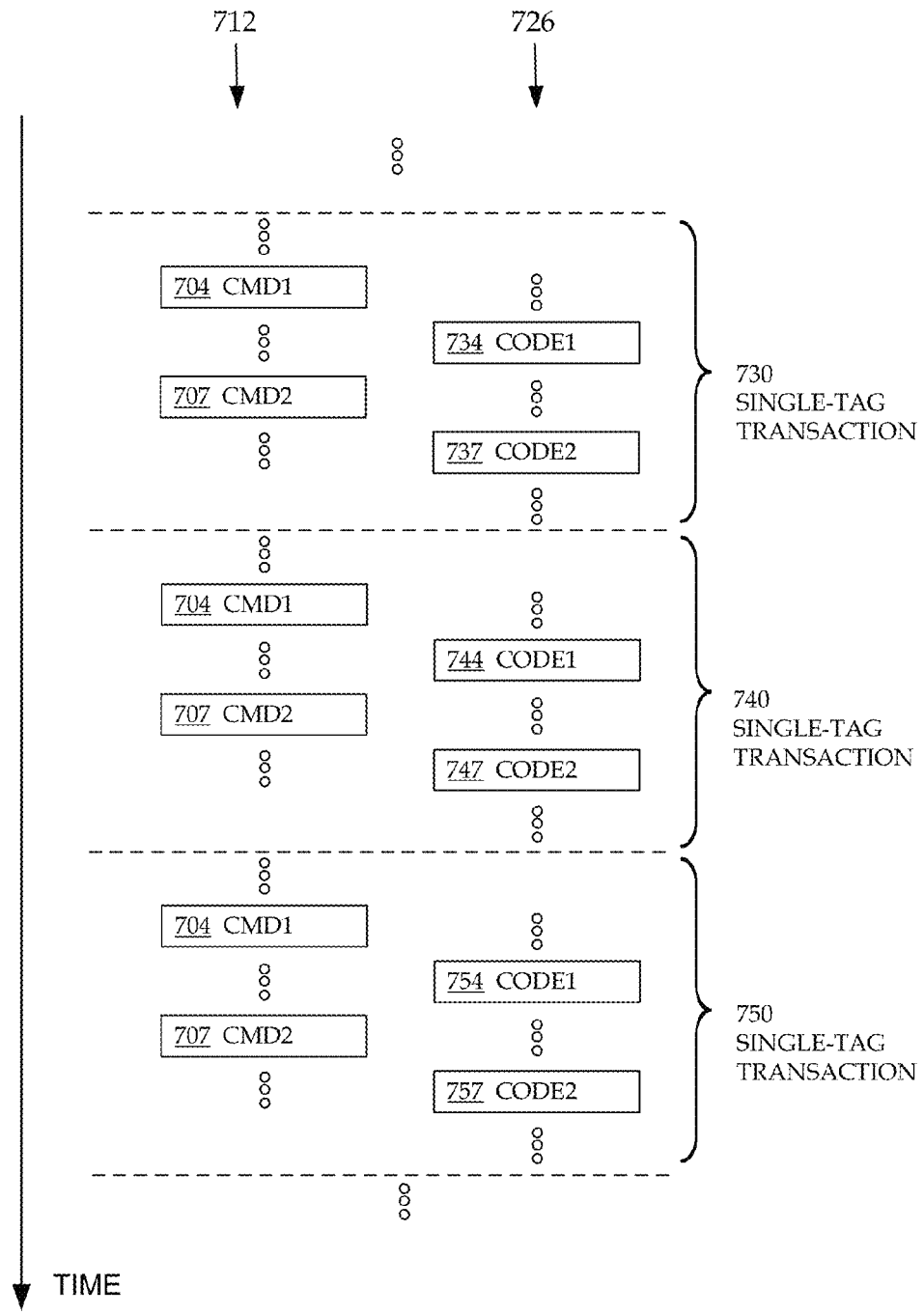
FIG. 7 is a timing diagram showing conventional commands from an RFID reader and replies from a population of RFID tags for reading first and second codes of the tags.

FIG. 7 is a timing diagram 700 showing conventional commands by an RFID reader, and replies by a population of RFID tags, for reading codes of the tags. Neither the reader nor the tags are shown in diagram 700. Timing diagram 700 proceeds downward along a vertical axis TIME, with commands 712 transmitted by the reader alternating with replies 726 backscattered by the tags.

In timing diagram 700, the reader singulates each tag successively, such that only one tag replies at a time, while the other tags are silent. While each tag is thus singulated, the reader reads its data by having a so-called transaction with the tag. Three transactions 730, 740, 750 are described as an example only, while tens, or hundreds, or thousands of such transactions can take place. In addition, each of transactions 730, 740, 750 is not necessarily described in full, but only some pertinent commands are given. Not shown are commands, for example, to singulate each tag, although the tag may backscatter one or more of the shown codes as a consequence of the singulation commands.

Each of transactions 730, 740, 750 is designed so as to read the desired information from the tags. In timing diagram 700, a first code and a second code, stored in memories of the tags, are read out, as follows. In first transaction 730 with one tag, a first command CMD1 704 elicits a first code CODE1 734 from the tag. Then a second command CMD2 707 elicits a second code CODE2 737 from the tag. Then, in transaction 740 with another tag, first command CMD1 704 is repeated, and elicits a first code CODE1 744 from the other tag. Then second command CMD2 707 is repeated, and elicits a second code CODE2 747 from the other tag. Then, in transaction 750 with an additional tag, first command CMD1 704 is repeated, and elicits a first code CODE1 754 from the additional tag. Then second command CMD2 707 is repeated, and elicits a second code CODE2 757 from the additional tag.

The first code and the second code can be any suitable codes. For example, the first code can be an Electronic Product Code (EPC) of the tag, associated with a host item to which the tag is attached. The second code can be a TID code of the tag, which complies with the Gen2 Specification. Or, the second code can be any one or more of: a date of expiration of the tag's host item, a date by which the host item is to be sold by, a date at which the host item was sold, a code for a sale of the host item, a receipt of the sale, an identifier for a retailer that made the sale, an identifier for a store through which the sale is made, an electronic signature, a cryptographic quantity, a random number, and so on. The second code could also alternately be an identifier for the tag, a password for the tag, an indicator for how a memory of the first tag is configured, and so on. Other codes can equivalently be used for the first and the second codes. In addition, what is called first and second codes can be interchanged, and so on.

As can be seen, each command takes time, each reply takes time, and there can be many transactions. And the time to read the tags can be constrained if the host items are moving. The invention addresses this timeliness problem.

FIG. 8 is a block diagram of an electrical circuit 824 according to embodiments. Circuit 824 may be formed in an IC of an RFID tag, such as IC 224 of FIG. 2. Circuit 824 has a number of main components that are described in this document. Circuit 824 may have a number of additional components from what is shown and described, or different components, depending on the exact implementation.

Circuit 824 includes at least two antenna connections 832, 833, which are suitable for coupling to one or more antenna segments (not shown in FIG. 8). Antenna connections 832, 833 may be made in any suitable way, such as using pads and so on. In a number of embodiments more than two antenna connections are used, especially in embodiments where more antenna segments are used.

Circuit 824 includes a section 835. Section 835 may be implemented as shown, for example as a group of nodes for proper routing of signals. In some embodiments, section 835 may be implemented otherwise, for example to include a receive/transmit switch that can route a signal, and so on.

Circuit 824 also includes a rectifier and Power Management Unit (PMU) 841. Rectifier and PMU 841 may be implemented in any way known in the art, for harvesting raw RF power received via antenna connections 832, 833. In some embodiments, rectifier and PMU 841 includes at least one rectifier, and so on.

In operation, an RF wave received via antenna connections 832, 833 is received by rectifier and PMU 841, which in turn generates power for components of circuit 824. This is true for either or both reader-to-tag (R→T) and tag-to-reader (T→R) sessions, whether or not the received RF wave is modulated.

Circuit 824 additionally includes a demodulator 842. Demodulator 842 demodulates an RF signal received via antenna connections 832, 833. Demodulator 842 may be implemented in any way known in the art, for example including an attenuator stage, an amplifier stage, and so on.

Circuit 824 further includes a processing block 844. Processing block 844 receives the demodulated signal from demodulator 842, and may perform operations. In addition, it may generate an output signal for transmission.

Processing block 844 may be implemented in any way known in the art. For example, processing block 844 may include a number of components, such as a processor, memory, a decoder, an encoder, and so on.

Circuit 824 additionally includes a modulator 846. Modulator 846 modulates an output signal generated by processing block 844. The modulated signal is transmitted by driving antenna connections 832, 833, and therefore driving the load presented by the coupled antenna segment or segments. Modulator 846 may be implemented in any way known in the art, for example including a driver stage, amplifier stage, and so on.

In one embodiment, demodulator 842 and modulator 846 may be combined in a single transceiver circuit. In another embodiment, modulator 846 may include a backscatter transmitter or an active transmitter. In yet other embodiments, demodulator 842 and modulator 846 are part of processing block 844.

Circuit 824 additionally includes a memory 850, which stores data. Memory 850 is preferably implemented as a Nonvolatile Memory (NVM), which means that the stored data is retained even when circuit 824 does not have power, as is frequently the case for a passive RFID tag. In some circumstances a portion of memory 850 may be nonvolatile and another portion volatile. The data stored in memory 850 can be a first code 854 and a second code 857 as per the above.

Processing block 844 is able to cause first code 854 to be backscattered, if command CMD1 704 is received. In some embodiments, processing block 844 is further able to cause second code 857 to be backscattered responsive to command CMD2 707. In other embodiments, second code 857 cannot be caused to be backscattered explicitly. These embodiments depend on the nature of second code 857. For example, some tags could be programmed to provide sale information responsive to a command, while not providing a password responsive to any command.

To improve over the process of FIG. 7, processing block 844 is additionally able to receive a third command, and in response cause to be backscattered a combination made from at least portions of the first code and the second code. This combination can be backscattered without receiving any commands in the interim, while the combination is being backscattered. There are many possibilities for the third command, and for the combination, which are described later in this document.

The invention also includes methods. An economy is achieved in the present document in that a single description is sometimes given for both methods according to embodiments, and functionalities of devices made according to embodiments. Plus, a single set of flowcharts is sometimes used to describe methods in and of themselves, along with operations of hardware and/or software and/or firmware where applicable. This is regardless of how each element is implemented.

Some methods of the invention are for the operation of RFID tags, and of ICs that are intended for use with RFID tags. These methods can be implemented in any number of ways, including the structures described in this document. Examples are now given.

FIG. 9 is flowchart 900 illustrating tag methods according to embodiments. At operation 905, a third command is received. At next operation 935, responsive to the third command being received, a combination is backscattered. No commands are received in the interim, while the combination is being backscattered. The combination is made from at least a portion of the first code, and at least a portion of the second code.

Other methods of the invention are for an operation of, or for controlling an operation of, an RFID reader, an RFID reader system, an RFID reader system component, or related software. These methods can be implemented in any number of ways, including the structures described in this document. In addition, individual operations of such methods may be practiced by different readers, at different phases of the lifetime of an RFID tag, with or without interruptions between them, and so on. Examples are now given.

FIG. 10 is flowchart 1000 illustrating methods according to embodiments for operating or controlling an operation of an RFID reader, an RFID reader system, an RFID reader system component, or related software. At operation 1005, a third command is caused to be transmitted to a tag. It will be recognized that this third command may be received by a tag at operation 905 described above.

At next operation 1035, responsive to causing the third command to be transmitted, there is received backscattered from the first tag a combination. No commands are caused to be transmitted while the combination is being backscattered. The combination is made from at least a portion of the first code, and at least a portion of the second code. It will be recognized that this combination can be what is backscattered by the tag at operation 935 described above. In some embodiments, the combination may also include at least a portion of a third code, at least a portion of a fourth code, and in fact any number of codes may be included in the combination.

In a number of embodiments, therefore, a separate command does not have to be sent for reading also the second code, after the first code is backscattered. This can save time in inventorying tags. An example is now described, which is best understood by contrasting with the earlier described FIG. 7.

FIG. 11 is a timing diagram 1100 showing commands by an RFID reader and replies by a population of RFID tags according to embodiments. Neither the reader nor the tags are shown in diagram 1100. The tags store the first code and the second code, as shown in FIG. 8. The commands in diagram 1100 result in replies with combinations of the first and of the second codes, according to embodiments.

Timing diagram 1100 proceeds downward along a vertical axis TIME, with commands 1112 transmitted by the reader alternating with replies 1126 backscattered by the tags. In the example of diagram 1100, the reader singulates each tag successively, such that only one tag replies at a time, while the other tags are silent. While each tag is thus singulated, the reader reads its data by having a transaction with the tag. Three transactions 1130, 1140, 1150 are described as an example only, while many more such transactions can take place. In addition, each of transactions 1130, 1140, 1150 is not necessarily described in full, but only some pertinent commands are given. Not shown are commands, for example, to singulate each tag for its transaction.

In first transaction 1130 with one tag, a third command CMD3 1105 elicits a combination 1135 of the tag. Combination 1135, as per the above, includes at least a portion of the first code and the second code stored in the tag memory. Then, in transaction 1140 with another tag, third command CMD3 1105 is repeated, and elicits a combination 1145 of the other tag. Then, in transaction 1150 with an additional tag, third command CMD3 1105 is repeated, and elicits a combination 1155 of the additional tag.

As can be seen by comparing to FIG. 7, transactions 1130, 1140, 1150 can take less time than respective transactions 730, 740, 750. In the embodiment of diagram 1100, according to a comment 1158, first code CODE1 754 and second code CODE2 757 were not backscattered in different installments, and with an intervening command 707 in the interim, as they were in corresponding transaction 750 of FIG. 7.

The nature of the third command is now described in more detail. In some embodiments, the third command is different from the first command. In other embodiments, the third command is identical to the first command, which can be convenient from the design point of view.

In some of embodiments, the tags backscatter the combination whenever they get the third command. In others, the tags have a Gush mode. While in the Gush mode, the tags backscatter the combination if they receive the third command, which can be different, or even the same as the first command.

In some embodiments the tags enter the Gush mode by a series of steps. In other embodiments the tags enter the Gush mode by receiving a Gush command. In yet other embodiments the Gush command can be a parameter of another command, such as a parameter of a command that singulates the tags or a parameter of a command that causes the tags to compute a cryptographic response. A tag may backscatter the combination responsive to receiving the Gush command and the third command. An example is shown in FIG. 11, where optional Gush command 1103 is transmitted prior to or as a part of the singulation.

In some embodiments, the tags are always capable of the Gush mode. In other embodiments, the Gush mode can operate only after it is enabled, and/or no longer operate after it is disabled. This can be accomplished in any number of ways. One such way is by additional commands. For example, in FIG. 11, an Enable Gush command 1102 precedes the Gush command 1103, and a Disable Gush command 1180 follows receipt of all combinations 1135, 1145, and 1155.

This feature can also be useful in testing the programming of tags produced in large numbers. In those cases, the second code can be of the type that is not made otherwise readily available to users. The combination can include, for example, a programmed EPC along with a passwords or the like, for confirmation of programming. Plus, the feature can be disabled, for shipping the confirmed tag in the field, for use by others.

The backscattered combination is now described in more detail. The combination is a code that is made from at least a portion of the first code, a portion of the second code, and in some embodiments include even more codes. Accordingly, the combination can include the first code, in whole or in part, scrambled or not scrambled. By "scrambled", it is meant with its bits interchanged, or encoded according to some key. Additionally, the combination can include the second code, in whole or in part, with its bits scrambled or not scrambled. If the combination includes other codes, they may also be included in whole or in part, with their bits scrambled or not scrambled. Plus, the included bits of the first code can be intermingled with those of the second or other codes, or not. Moreover, one or more error-checking codes can be generated for one or more individual codes and/or the combination, for the reader to check the correctness of the received backscatter.

In some embodiments, the combination is always formed by the tag in the same way from the bits of the first code, the second code, and optional other codes. In other embodiments, the combination can be formed in different ways. In some of those, the combination is further configured responsive to the Gush command.

In a number of embodiments, the combination includes the first code or its portion, and the second code or its portion, with their bits not intermingled or scrambled. The first code or its portion can be before or after the second code or its portion. Examples are now described. In these examples, only the first code and the second code are shown, although it should be understood that the combination may include more codes.

FIG. 12 is a diagram illustrating an embodiment of a combination 1235 along a TIME axis. At least a portion 1234 of the first code is followed by at least a portion 1237 of the second code. According to a comment 1238, there is no interim pause between portion 1234 and portion 1237. In other words, portion 1234 occurs contiguously with portion 1237 in combination 1235.

FIG. 13 is a diagram illustrating an embodiment of a combination 1335 along a TIME axis. At least a portion 1334 of the first code is followed by at least a portion 1337 of the second code. In combination 1335 there is an interim pause 1338 between portions 1334 and 1337, which has a non-zero duration DT.

In some embodiments, duration DT has a given value. In other embodiments, it can be tuned.

FIG. 14 is a conceptual diagram for illustrating how a duration DT of the interim pause can be further tuned according to embodiments. A Tune command 1470 is caused to be transmitted by the reader, and received by the tag. Tune command 1470 can be any convenient command, such as the third command, the Gush command, the Enable Gush command, the Disable Gush command, or other command in the communication. Tune command 1470 encodes a duration value. The duration DT can thus be determined from the duration value.

In the example of FIG. 14, the duration value is a two-bit field code 1472. Here the duration value is shown with the possible values it can take. Each value results in a different duration DT, namely one of DT1, DT2, DT3, DT4. The duration DT can be expressed in number of clock cycles, in a number of RF cycles, or in other units of time convenient for this purpose. Thus, for example, duration DT can have values chosen among the values of 0, 4 msec, 8 msec, and 12 msec. In addition, such a delay should not be too long, because then other communication may start taking place. According to comment 1438, where DT1=0, that is the case of no interim pause.

In some embodiments, a combination may include one or more error-checking codes associated with the portion of a first code, a portion of a second code, a portion of another code included in the combination, and/or the entire combination. FIG. 15A is a conceptual diagram depicting a combination 1535 including a portion 1534 of a first code, a portion 1537 of a second code, and an error-checking code 1538. In some embodiments, the error-checking code 1538 may be a cyclic-redundancy check (CRC), and may be calculated based on the entire combination 1535. In other embodiments, one or more portions of a code included in a combination may have its own error-checking code. FIG. 15B depicts a combination 1540 including a portion 1534 of a first code, a portion 1537 of a second code, an error-checking code 1542 associated with the portion 1534 of the first code, and an error-checking code 1544 associated with the portion 1537 of the second code. In some embodiments, the error-checking code for each portion of the code in the combination may be appended to the associated portion of code, prepended to the associated portion of code, inserted into the associated portion of code, or interspersed within the associated portion of code. In some embodiments a reader may use the error-checking code or codes to check the correctness of the received backscatter; in other embodiments a reader may use the error-checking code or codes to correct errors in the received backscatter.

One or more of the above-mentioned commands (e.g. Gush, Enable Gush, Disable Gush, Tune, third command, etc.) may be a part of the applicable communication protocol. Optionally, they may be repurposed commands from the communication protocol, where the entire command, or only a portion of the command, is repurposed. Alternatively, they may be custom commands not specified in the communication protocol. The commands can be constructed in any number of ways. In some instances they may be standalone commands, made from a sequence of bits chosen so that they do not conflict with other commands of the protocol. In some instances they can be commands that are known to the protocol or not, with a special payload that distinguishes among different custom features and optionally transfers a parameter for the features.

When commands are used that are known to the protocol, a section of their payload can be advantageously used for the purpose of implementing the Gush and/or Tune functionality. Such a section in the payload can be a mask field, according to embodiments. As an example for the Gen2 Specification, one such command (among several) is the Select command. The Select command may be advantageous because it can be transmitted before or after a tag is singulated out of its population. Each one of the custom commands can thus be constructed as an implementation of this Select command. An example is now described.

FIG. 16A is a table illustrating the fields of the Select command of the Gen2 Specification. Version 1.1.0 and 1.2.0 of the Gen2 Specification is hereby incorporated by reference in its entirety. The fields of this Select command are explained in more detail in the above mentioned Gen2 Specification. In addition, the implementation of this Select command can have a custom payload so that it operates as the Gush command, the Enable Gush command, the Disable Gush command, the Tune command, and/or another custom command.

FIG. 16B is a table illustrating how a number of custom commands can be enabled in a reader and a tag. EBV stands for Extensible Bit Vector. The Mask Field can be partitioned as shown, into two primary subfields, named FEF and FCF.

The Feature Enabling Field (FEF) enables the tag to verify that it is a proper recipient for the command, by comparing the transmitted FEF value against a value in Membank. In this case, Membank can be EPC, TID or USER memory. As can be seen, the FEF can be further partitioned into subfields for better clarity. Such subfields might include, for example if Membank is TID memory as described in Gen2 v1.1.0, a Class Identifier, the MDID, and an Indicator Bit.

The Class Identifier can be two bits. For example, EPCglobal can correspond to a value of 10. This would allow the custom command to apply, for example, only to EPCglobal tags.

The MDID is the tag manufacturer's ID, which is stored in the tag's TID memory. For Impinj tags, this number is 000000000001 or 100000000001. The MDID allows a reader to select tags of only the manufacturer of interest. So, even if this Select command is transmitted and received before singulation, the Select command can select also according to the tag manufacturer's ID. This will cause the manufacturer's tags to be selected, and thus the reader can ensure prior knowledge of the tag manufacturer's identification.

The Indicator Bit can be set to 0 or 1. In the Gen2 Spec, a tag model number follows the MDID. A bit of this model number can serve as the Indicator Bit, and can be interpreted as follows: If it is 0, the tags can interpret the command as an "ordinary" Select, and execute it per the Gen2 Spec. Else, if it is 1, the tags can interpret the Select command as a custom instruction, and execute according to the FCF.

The Feature Command Field (FCF) can have a command code that indicates the number of the custom instruction. For example, a command code of 00000 could be the Gush command. A 5-bit field permits 32 possible custom commands. A command code of 11111 could indicate an extended command field that extends into the subsequent data field, allowing more than 32 custom commands.

The data field can contain data needed to implement the custom instruction, if any. Not all commands will use it. The data field can be variable in size. Its meaning will derive from the command code. For example, the duration value of the Tune command can be encoded as data in the FCF subfield shown in FIG. 14.

In some embodiments, the tag may ignore the Target and Action field in the Select command, depending on whether these fields are relevant. In other embodiments, the tag may also set the appropriate Target flag.

In preferred embodiments, the entire Select command must be valid for the tag to accept and execute the custom command. That means valid values for Membank, Length, Pointer, Mask, CRC-16, etc. An example is now described.

FIG. 16C is a table showing sample values that can be used for the table of FIG. 16B. These could be used for a custom Gush command. The Membank having a binary value of 10 point to the TID memory. The pointer having a hex value of 06 h points to the last two bits of the class identifier. The length having a hex value of 14 h points to a length of 20 bits that follow thereafter.

In some embodiments, backscattering a combination of codes may be used in the context of cryptographic interactions between an RFID reader and one or more RFID tags, as described below.

Figure 17B:
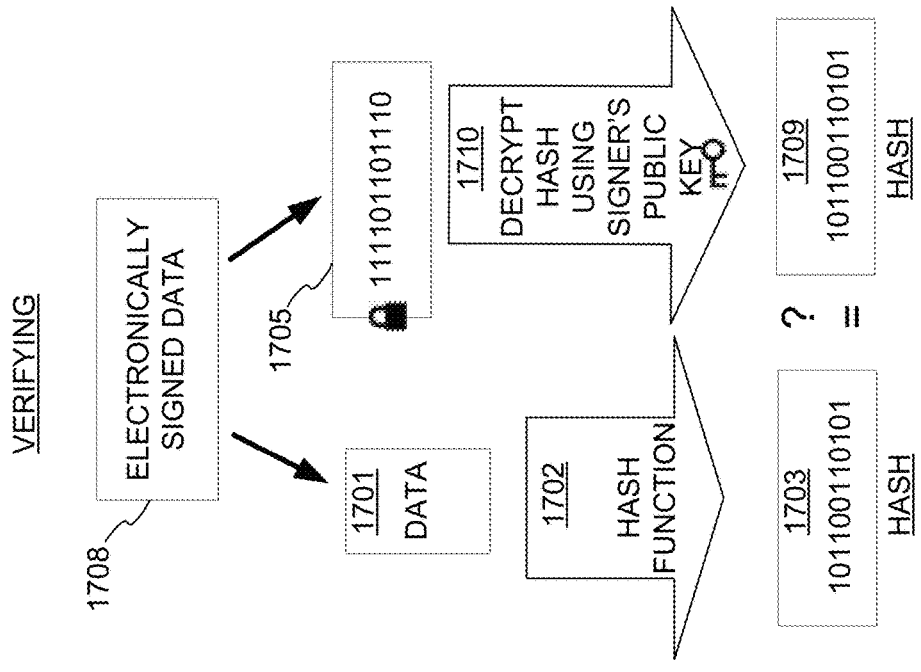
FIGS. 17A-B are flow diagrams illustrating generating and verifying an electronic signature.
Figure 17A:
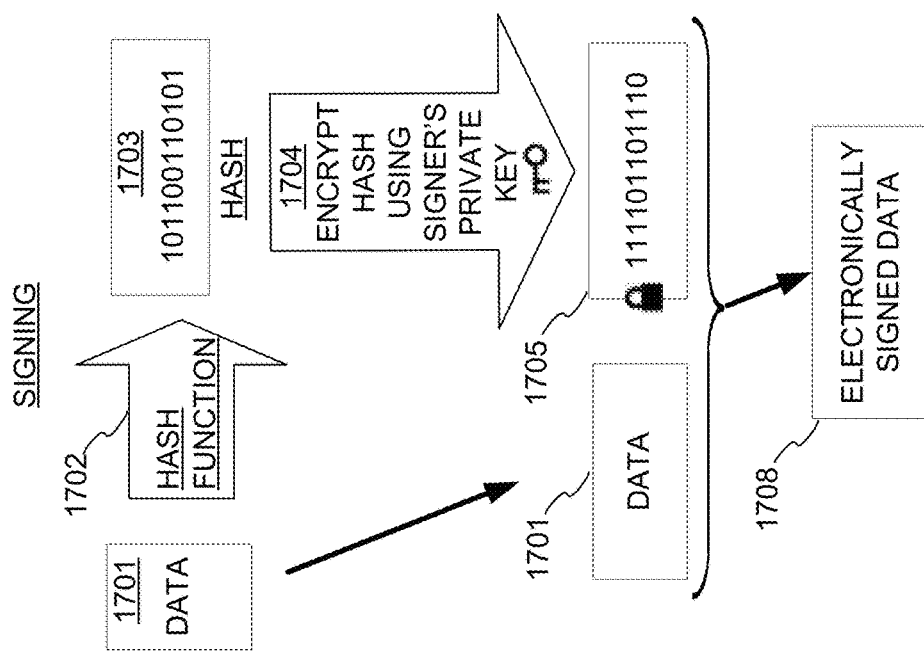

FIGS. 17A and 17B are flow diagrams illustrating generating and verifying an electronic signature (ES). Electronic signatures allow verification of the authenticity and integrity of an electronic message, including whether the message originated from a claimed sender and/or whether the message is original or has been altered. Electronic signatures often use digital bits or coding, in which case they may be termed digital signatures. In this disclosure the terms "electronic signature", "digital signature", and "ES" are used interchangeably.

Electronic signatures often employ asymmetric cryptography. A signatory, also referred to as a sender, possesses a private-public key pair where the private and public keys are mathematically related to each other. The sender uses the private key to generate the ES. A recipient uses the sender's public key to verify the ES. A verified ES provides the recipient with some confidence that the message was created by a known sender and that it was not altered in transit.

FIG. 17A is a flow diagram illustrating an asymmetric method for generating an ES. A hash value 1703 is derived from data 1701 and a hash function 1702. The hash value 1703 is encrypted using the signer's private key (1704). The encrypted hash value is the ES 1705. The ES 1705 is attached to the data 1701 to form electronically-signed data 1708.

FIG. 17B is a flow diagram illustrating an asymmetric method for verifying an ES. The electronically signed data 1708 is split into two components, data 1701 and ES 1705. The hash value 1703 is derived from data 1701 and hash function 1702. The ES 1705 is decrypted using the signer's public key 1710 to form a decrypted hash value 1709. The hash value 1703 is compared with the decrypted hash value 1709. If the hash value 1703 is equal to the decrypted hash value 1709 then the ES 1705 is considered verified or proper. A verified ES provides assurance that the data 1701 was signed by the known sender and that the data has not been altered.

An important attribute of digital/electronic signatures is that they are difficult to forge. A number of standards have been developed for digital signatures. The Digital Signature Standard (DSS) is a U.S. Government standard for digital signatures. DSS is specified in Federal Information Processing Standards (FIPS) 186-1 and FIPS 186-3. FIPS 186-1 specifies two digital signature algorithms, the Digital Signature Algorithm (DSA) and the RSA digital signature algorithm. FIPS 186-3 includes a third digital signature algorithm, the Elliptic Curve Digital Signature Algorithm (ECDSA). FIPS 180-3, the Secure Hash Standard (SHS), specifies the hash functions to be used in conjunction with FIPS 186-1 and FIPS 186-3. The DSS, FIPS 186-1, FIPS 186-3, and FIPS 180-3 are hereby incorporated by reference in their entireties.

Figure 18:
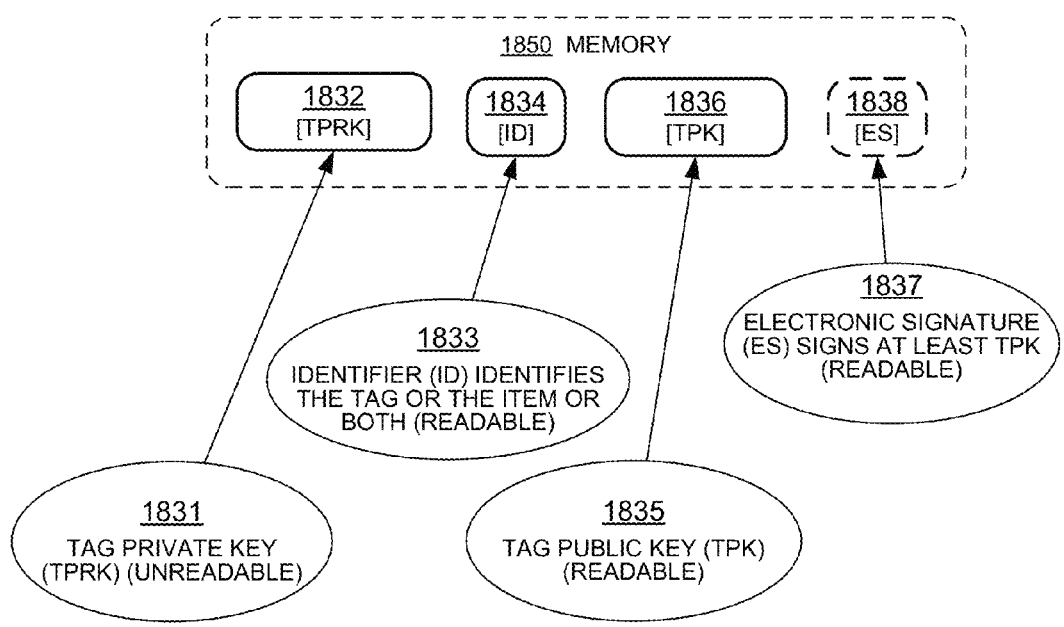
FIG. 18 illustrates how a tag private key, an identifier, a tag public key, and an electronic signature may be stored in an RFID tag according to embodiments.

FIG. 18 illustrates how a tag private key, an identifier, a tag public key, and an electronic signature may be stored in an RFID tag according to embodiments.

Tag memory 1850 in diagram 1800, which is similar to tag memory 850 in diagram 824, may store a variety of data. Some of the data relevant to this disclosure may include a tag private key (TPRK) 1832, an identifier (ID) 1834, a tag public key (TPK) 1836, and an electronic signature (ES) 1838.

A tag manufacturer or other legitimate entity may generate the tag private-public (TPRK-TPK) key pair. The tag keeps its TPRK secret. The tag uses the TPRK when responding to reader challenges. A signing authority, which holds a master private-public key pair, generates a tag-specific ES 1838 based on at least the signing authority's master private key and the TPK 1836. The tag does not normally keep either the TPK or the ES secret. The ES signs at least the TPK, and may sign the ID 1834 and/or other tag information as well.

As shown in FIG. 18, the tag stores its TPRK 1832 in memory portion 1831 which is typically unreadable by a reader. The tag stores its ID 1834, which identifies the tag and/or an item to which the tag is attached, in memory portion 1833 which is typically readable by a reader. This ID may be a tag identifier (TID), item identifier like an EPC code (EPC) or a unique item identifier (UII), or other number like a serialized global trade identification number (SGTIN) according to some standardized protocols. The tag stores its TPK 1836 in memory portion 1835 which is typically readable by a reader. The tag stores its ES 1838 in memory portion 1837 which is also typically readable by a reader.

Counterfeiters can clone tags that do not have a hidden key or other hidden secret by simply copying the tag memory contents. Counterfeiters cannot easily clone tags built according to embodiments because the tags contain an unreadable TPRK and use challenge-response methods for authentication.

Embodiments also provide a means for a reader to authenticate a tag without needing to know a unique password or key for each tag. The tag exposes its TPK, protected by an ES, to the reader. The reader uses the signing authority's master public key and the ES to verify the TPK. The reader then uses the verified TPK and a challenge-response dialog to authenticate the tag, as described below.

Embodiments can be used for items and applications requiring counterfeit detection, where genuine items have authentic tags but non-genuine items do not have authentic tags and can be discovered, traced, and removed. Embodiments render counterfeiting or cloning a tag difficult by providing each authentic tag with a (ideally) unique private-public key pair and allowing a reader to verify the tag's authenticity without needing to store a unique public key for every tag and without needing to access a network every time it wants to verify a tag. Example applications include retail, food safety, pharmaceutical, document protection, and the currency industries.

Figure 19:
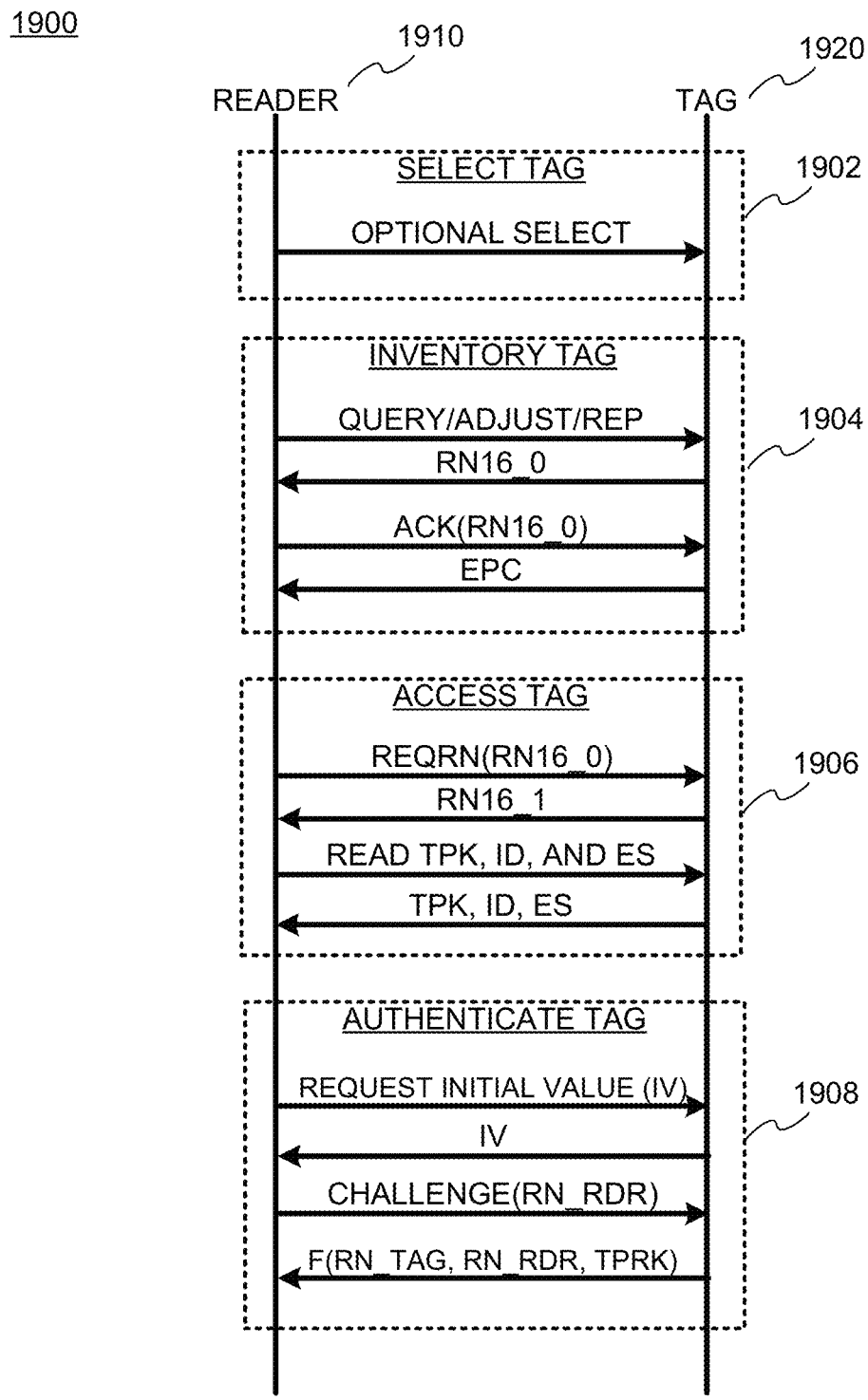
FIG. 19 illustrates command-response exchanges between a reader and a tag according to embodiments.

FIG. 19 illustrates command-response exchanges between a reader and a tag according to embodiments. Although the commands and responses in diagram 1900 of FIG. 19 assume that the reader and tag are using the Gen2 Specification for their communications protocol, the present invention does not require using the Gen2 Specification, and other communications protocols and command sequences are possible. Additionally, even when using the Gen2 Specification the particular order of operations need not follow that shown in FIG. 19. Other orderings are possible; exchanges can be merged, enhanced, or eliminated; and the authentication can be spread across various operations between reader and tag.

The interactions between reader 1910 and tag 1920 in diagram 1900 begin with an optional tag selection 1902, where the reader selects one or more tags from among a tag population for subsequent inventory and authentication. In some embodiments, this optional selection may enable a Gush functionality as described above for the selected tags. This optional selection is followed by an inventory 1904, where the reader singulates a tag and receives an identifier from the tag. The shown inventory uses the Query-ACK sequence described in the Gen2 Specification. Inventory is followed by access 1906, where the reader accesses the tag and reads the tag's TPK, optional ID, and ES. In some embodiments, instead of sending the individual codes separately, the tag may backscatter a combination including its TPK, optional ID, ES, and/or any other code(s), as described above. Finally, access is followed by authentication 1908, where the reader authenticates the tag using a challenge-response dialog as described herein.

As described above, embodiments include different orderings of interactions between reader and tag. For example, in some embodiments the reader may send a challenge during tag selection 1902, preceding the access 1906 where the reader reads the tag's TPK, and the tag may compute its response and store the response in memory for subsequent reading by a reader. The tag's computation may include a tag random number, and the tag may also store this random number for subsequent reading by the reader. Indeed, in embodiments where the challenge occurs during tag selection, and reading the response occurs during tag access, authentication 1908 need not exist, because its operations have been spread among select 1902 and access 1906. One reason a reader may choose to send the challenge with select 1902 is for multiple tags to hear the challenge and compute their cryptographic responses in parallel. Because cryptographic computations can be time intensive, enabling multiple tags to compute their responses in parallel allows more rapid authentication of a population of tags.

Authentication 1908 can include many options, depending on the chosen cryptographic algorithm. In the particular embodiment shown in FIG. 19, the reader first requests a tag random number from the tag. The tag generates a tag random number, calculates an initial value (IV) from the tag random number and the TPRK, and sends the IV to the reader. The reader then challenges the tag with a reader-generated random number. The tag computes its response based on the TPRK, the tag random number, and the reader challenge, and sends its response to the reader. In some embodiments, the tag may backscatter a combination of its response and one or more other codes, such as the tag IV, a tag identifier, and/or some other identifier, as described above. At this point the reader can verify the tag's response using the IV, the reader random number, and the TPK. Of course, some challenge-response variants do not use an IV; others may include a command count or a message-authentication code; others may include the reader encrypting the random number in the reader challenge; and yet others may include fewer or more steps than shown.

According to embodiments a reader retrieves a tag's TPK and ES, obtains the signing authority's master public key via a network or other means, verifies the TPK, challenges the tag with a random number, receives the tag's response, and verifies the response using the TPK. In some embodiments the reader may also retrieve an ID from the tag, and may use the ID to indicate a signing authority or a particular master key. In some embodiments the challenge may include the reader encrypting a random number (RN) using the TPK, sending the encrypted RN to the tag, receive a decrypted RN from tag, and verifying by comparing the RN before encryption with the received, decrypted RN. In other embodiments the challenge may include the reader sending an RN to the tag, receiving an encrypted RN from tag, decrypting the received RN using the TPK, and verifying by comparing the sent RN with the decrypted, received RN.

Figure 20:
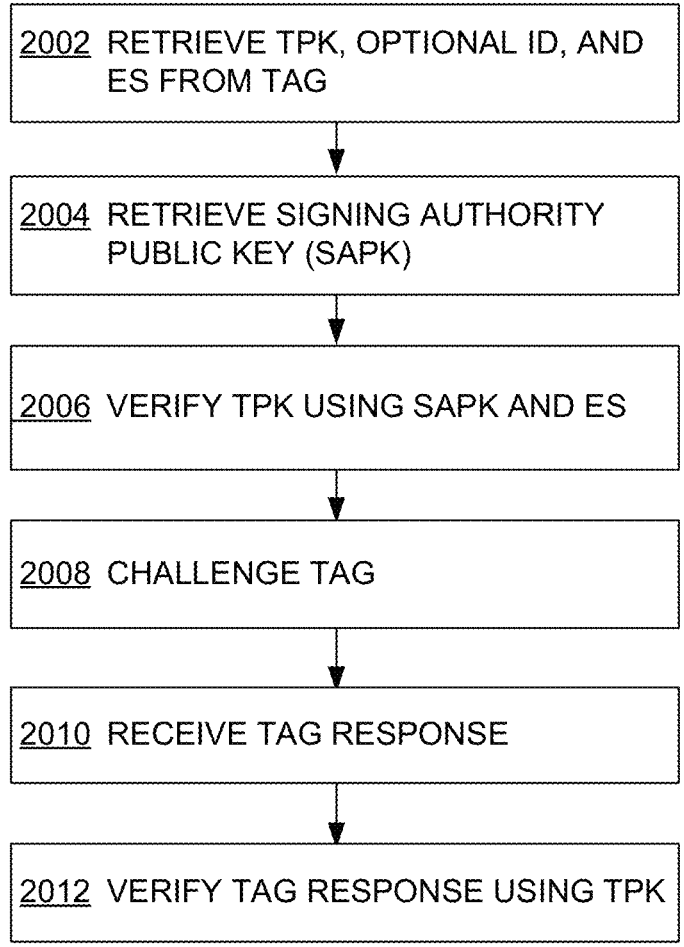
FIG. 20 is a flowchart illustrating a process for a reader authenticating a tag according to embodiments.

FIG. 20 is a flowchart illustrating a process for a reader authenticating a tag according to embodiments. Process 2000 begins with operation 2002, where the reader retrieves at least a TPK and an ES from a tag. Optionally, the reader may also retrieve an ID which may be a tag identifier, an item identifier, or both. In some embodiments, two or more of the codes retrieved by the reader are backscattered by the tag as a combination, as described above. At operation 2004 the reader retrieves a signing-authority public key (SAPK), also known as a master public key, from a signing authority. In some embodiments the reader may use the ID to help identify the proper signing authority, or may use the ID to help identify which SAPK to use from a given signing authority. In some embodiments the reader may retrieve the SAPK indirectly, via a 3$^{rd}$ party. In some embodiments, the SAPK may be stored at the reader, and the reader may access the stored SAPK instead of having to retrieve it from the signing authority. In certain embodiments, the reader may receive the SAPK from the reader, for example in a combination backscattered by the tag at operation 2002. At operation 2006 the reader verifies the TPK using the SAPK and ES. At operation 2008 the reader challenges the tag. According to some embodiments the reader challenge may include a random number. At operation 2010 the reader receives a tag response to the challenge. In some embodiments the tag backscatters a combination of its tag response and one or more other codes. At operation 2012 the reader verifies the tag response using the TPK. If the verification is successful then the tag is presumed genuine.

The operations described in process 2000 are for illustrative purposes only. An RFID tag-authentication process using cryptographic techniques may be implemented using additional or fewer operations, using symmetric or asymmetric ciphers, and in different orders using the principles described herein.

FIGS. 17A, 17B, 18, 19, and 20 suggest many candidate implementations of and uses for the Gush and/or Tune functionality. As specific but non-limiting examples the Select command, the Query/QueryAdj/QueryRep commands, and the reader challenge can individually or together, as repurposed or parameterized or custom commands, implement the above-mentioned functionality (e.g. Gush, Enable Gush, Disable Gush, Tune, third command, etc.). Similarly, as specific but non-limiting examples the combination codes can be formed from two or more of the ID (EPC, TID, UII, etc), TPRK, TPK, ES, IV, tag random number, and tag response to the challenge. Finally, these codes can be retrieved from tag volatile memory, tag nonvolatile memory, or from a combination thereof.

Figure 21:
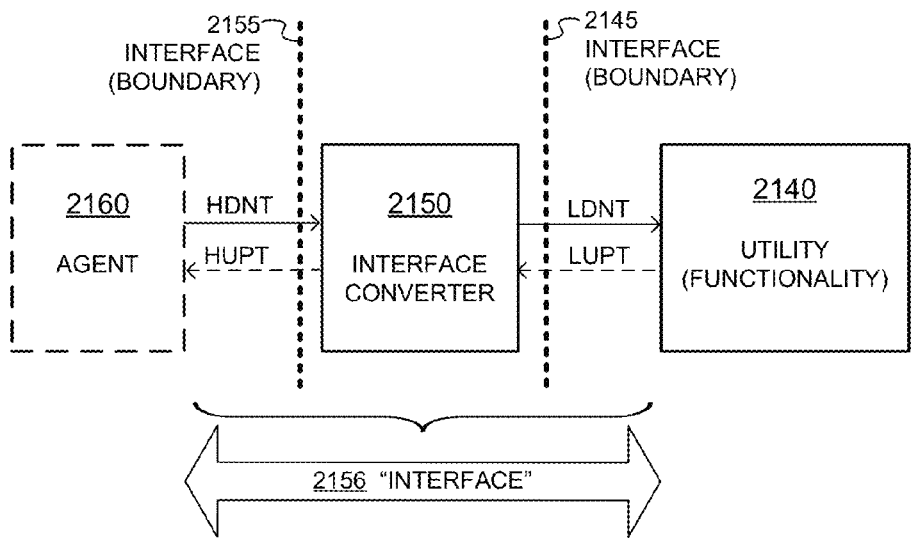
FIG. 21 is a block diagram illustrating an architecture for an interface converter according to embodiments.

FIG. 21 is a block diagram illustrating an architecture 2100 for an interface converter according to embodiments. Architecture 2100 includes a utility 2140, which is a mechanism for performing some or all of the reader features described above.

More particularly, utility 2140 may cause a tag to store one or more received instructions in its memory, execute the instructions in response to a subsequent command or trigger event, and respond differently to a reader command based on results generated by executing the instructions.

Architecture 2100 additionally includes an interface converter 2150 and an agent 2160. Embodiments also include methods of operation of interface converter 2150. Interface converter 2150 enables agent 2160 to control utility 2140. Interface converter 2150 is so named because it performs a conversion, a change, as will be described in more detail below. Agent 2160, interface converter 2150, and utility 2140 can be implemented in any way known in the art. For example, each can be implemented in hardware, middleware, firmware, software, or any combination thereof. In some embodiments, agent 2160 is a human.

Between interface converter 2150, agent 2160 and utility 2140 there are respective boundaries 2155, 2145. Boundaries 2155, 2145 are properly called interfaces, in that they are pure boundaries, as is the above described air interface.

In addition, it is a sometimes informal usage to call the space between boundaries 2155 and 2145, which includes interface converter 2150, an "interface" 2156. Further, it is common to designate this space with a double arrow as shown, with an understanding that operations take place within the arrow. So, although "interface" 2156 is located at a boundary between agent 2160 and utility 2140, it is not itself a pure boundary. Regardless, the usage of "interface" 2156 is so common for interface converter 2150 that this document sometimes also refers to it as an interface. It is clear that embodiments of such an "interface" 2156 can be included in this invention, if they include an interface converter that converts or alters one type of transmission or data to another, as will be seen below.

Agent 2160 can be one or more layers in an architecture. For example, agent 2160 can be something that a programmer programs to. In alternative embodiments, where agent 2160 is a human, interface converter 2150 can include a screen, a keyboard, etc. An example is now described.

Figure 22:
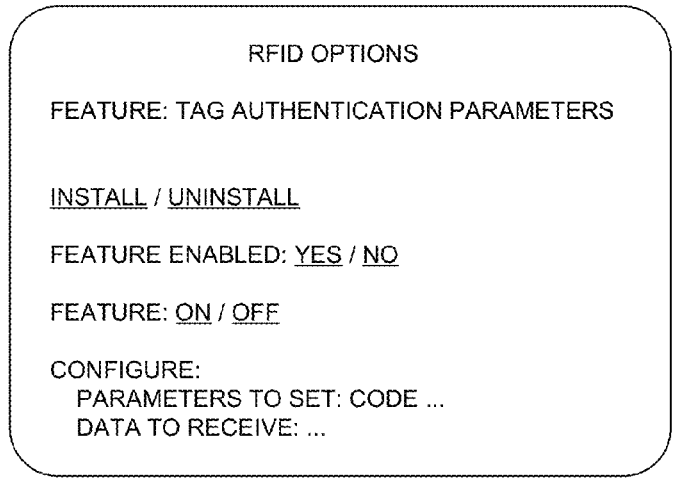
FIG. 22 is a sample screenshot 2250 of an interface converter, such as the interface converter of FIG. 21, according to an embodiment.

FIG. 22 is a sample screenshot 2250 of an interface converter, such as the interface converter of FIG. 21. Screenshot 2250 can be that of a computer screen for a human agent, according to an embodiment. What is displayed in screenshot 1550 exposes the functionality of a utility, such as utility 2140. Inputs by the user via a keyboard, a mouse, etc., can ultimately control utility 2140. Accordingly, such inputs are received in the context of screenshot 2250. These inputs are determined from what is needed for controlling and operating utility 2140. An advantage with such interfacing is that agent 2160 can prepare RFID applications at a higher level, without needing to know how to control lower level RFID operations. Such lower level RFID operations can be as described in the Gen2 Specification, in cryptographic algorithms, in other lower level protocols, etc. Utility 2140 can be controlled in any number of ways. Some such ways are now described.

Returning to FIG. 21, one way interface converter 2150 can be implemented is as a software Application Programming Interface (API). This API can control or provide inputs to an underlying software library, and so on.

Communications can be made between agent 2160, interface converter 2150, and utility 2140. Such communications can be as input or can be converted, using appropriate protocols, etc. What is communicated can encode commands, data, etc. Such communications can include any one or a combination of the following: a high-down communication HDNT from agent 2160 to interface converter 2150; a low-down communication LDNT from interface converter 2150 to utility 2140; a low-up communication LUPT from utility 2140 to interface converter 2150; and a high-up communication HUPT from interface converter 2150 to agent 2160. These communications can be spontaneous, or in response to another communication, or in response to an input or an interrupt, etc.

Commands are more usually included in communications HDNT and LDNT, for ultimately controlling utility 2140. Controlling can be in a number of manners. One such manner can be to install utility 2140, or just a feature of it. Such installing can be by spawning, downloading, etc. Other such manners can be to configure, enable, disable, or operate utility 2140, or just a feature of it. These commands can be standalone, or can carry parameters, such as data, instructions to be stored by tags, etc. In some embodiments interface converter 2150 can convert these commands to a format suitable for utility 2140.

Data is more usually included in communications HUPT and LUPT. The data can inform as to success or failure of executing an operation. The data can also include tag data, which can be both codes read from tags and data about reading tags (such as time stamps, date stamps, etc.). In some embodiments interface converter 2150 can convert the data to a format suitable for agent 2160, including in some cases aggregating, filtering, merging, or otherwise altering the format or utility of the data.

It should be noted that what passes across a single pure boundary is unchanged (by the mere definition of what is a pure boundary). But what passes through interface converter 2150 can be changed or not. More particularly, high-down communication HDNT can be being encoded similarly to, or differently from, low-down communication LDNT. In addition, low-up communication LUPT can be encoded similarly to, or differently from, high-up communication HUPT. When different, the difference can be attributed to interface converter 2150, which performs a suitable change, or conversion, of one communication to another. The change, or conversion, performed by interface converter 2150 is for exposing the functionality of utility 2140 to agent 2160, and vice versa. In some embodiments, a command is converted, but a parameter is passed along without being converted. Plus, what is not converted at one module may be converted at another. Such modules taken together can also form an interface converter according to embodiments.

Figure 23:
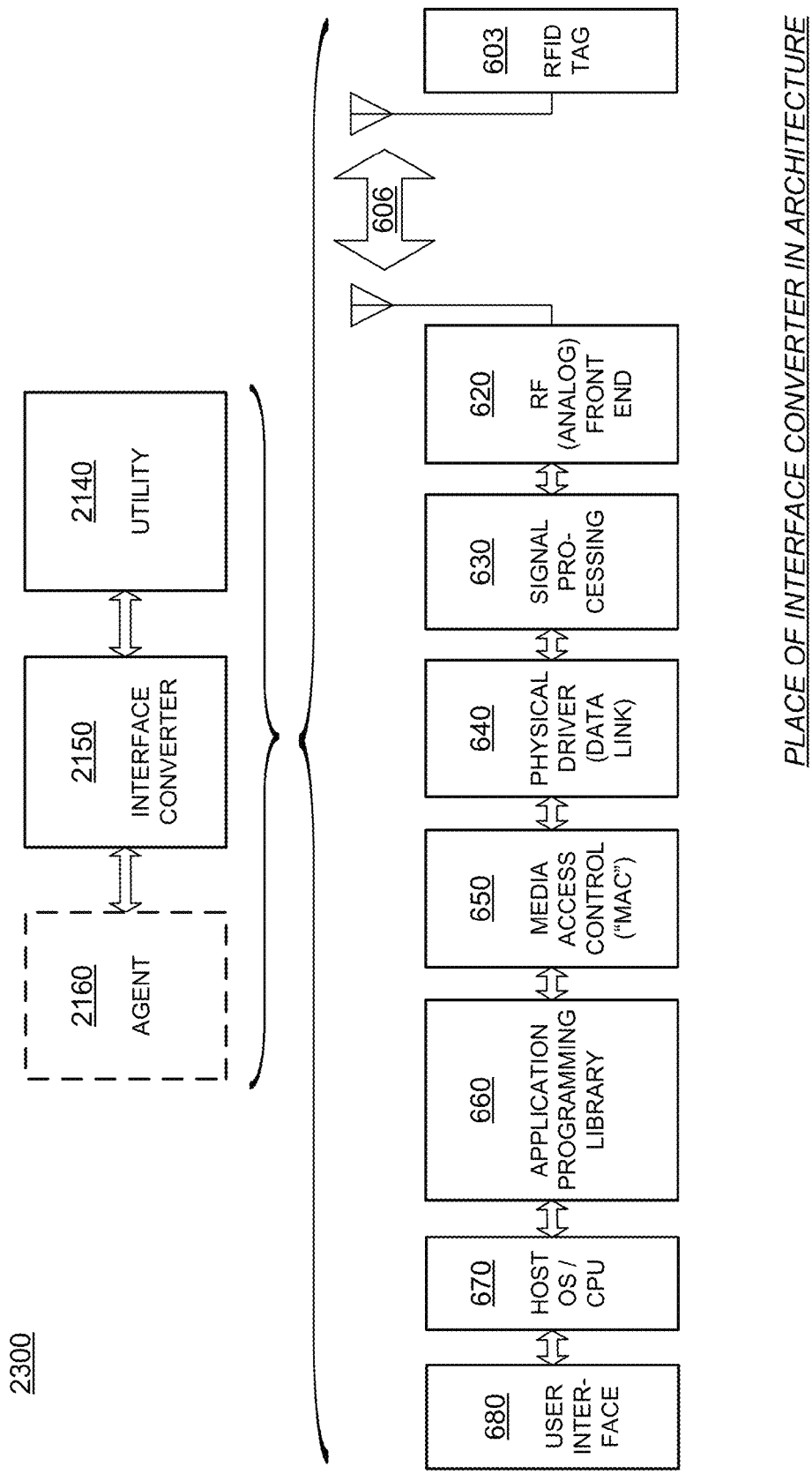
FIG. 23 is a is diagram for showing a correspondence for how components of FIG. 21 can be implemented by those of FIG. 6, in embodiments where the interface converter is implemented by a reader.

Agent 2160, interface converter 2150, and utility 2140 can be implemented as part of a reader, or as a different device. For being implemented as part of a reader, FIG. 23 suggests a scheme 2300 where agent 2160, interface converter 2150, and utility 2140 can be implemented in connection with respective reader modules that are suitable, depending on the requirements.

Everything described above in terms of readers and reader components finds some correspondence with tags and tag ICs, and vice versa. Numerous details have been set forth in this description, which is to be taken as a whole, to provide a more thorough understanding of the invention. In other instances, well-known features have not been described in detail, so as to not obscure unnecessarily the invention.

The foregoing detailed description has set forth various embodiments of the devices and/or processes via the use of block diagrams and/or examples. Insofar as such block diagrams and/or examples contain one or more functions and/or aspects, it will be understood by those within the art that each function and/or aspect within such block diagrams or examples may be implemented, according to embodiments formed, individually and/or collectively, by a wide range of hardware, software, firmware, or virtually any combination thereof.

The present disclosure is not to be limited in terms of the particular embodiments described in this application, which are intended as illustrations of various aspects. Many modifications and variations can be made without departing from its spirit and scope, as will be apparent to those skilled in the art. For example, transceivers in this disclosure are interchangeable with RFID readers, and vice-versa. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, antennas, transmission lines, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). Where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

The invention claimed is:

1. An integrated circuit for a Radio Frequency Identification (RFID) reader configured to communicate with an RFID tag that stores a first code, determines a response to a challenge, and backscatters the first code responsive to receiving a first command, the integrated circuit configured to:
   cause a challenge to be transmitted to the tag;
   cause a third command to be transmitted to the tag; and
   receive, responsive to causing the third command to be transmitted, backscattered from the tag a combination made from at least portions of the first code and the response without causing any commands to be transmitted while the combination is being backscattered.

2. The integrated circuit of claim 1, wherein the third command includes the challenge.

3. The integrated circuit of claim 1, wherein the third command is a singulation command.

4. The integrated circuit of claim 1, wherein the first code is an Electronic Product Code (EPC) of the tag for a host item to which the tag is attached.

5. The integrated circuit of claim 1, further configured to cause a second command to be transmitted to the tag, the second command configured to cause the tag to backscatter a second code, wherein the combination further includes at least portions of the second code.

6. The integrated circuit of claim 1, further configured to determine an authenticity of the tag response.

7. The integrated circuit of claim 1, wherein the third command is identical to the first command.

8. The integrated circuit of claim 1, further configured to cause a Gush command to be transmitted to the tag such that the combination is backscattered in response to the tag receiving the Gush command and the third command.

9. The integrated circuit of claim 8, wherein the Gush command includes the challenge.

10. A method for a Radio Frequency Identification (RFID) reader configured to communicate with an RFID tag that stores a first code, determines a response to a challenge, and backscatters the first code responsive to receiving a first command, the method comprising:
    causing a challenge to be transmitted to the tag;
    causing a third command to be transmitted to the tag; and
    receiving, responsive to causing the third command to be transmitted, backscattered from the tag a combination made from at least portions of the first code and the response without causing any commands to be transmitted while the combination is being backscattered.

11. The method of claim 10, wherein the third command includes the challenge.

12. The method of claim 10, wherein the third command is a singulation command.

13. The method of claim 10, wherein the first code is an Electronic Product Code (EPC) of the tag for a host item to which the tag is attached.

14. The method of claim 10, further comprising:
causing a second command to be transmitted to the tag, the second command configured to cause the tag to backscatter a second code, wherein the combination further includes at least portions of the second code.

15. The method of claim 10, further comprising determining an authenticity of the tag response.

16. The method of claim 10, wherein the third command is identical to the first command.

17. The method of claim 10, further comprising:
causing a Gush command to be transmitted to the tag such that the combination is backscattered in response to the tag receiving the Gush command and the third command.

18. The method of claim 17, wherein the Gush command includes the challenge.

19. An integrated circuit for a Radio Frequency Identification (RFID) reader configured to communicate with an RFID tag that stores a first code and a second code, determines at least one error-checking code associated with one of the first code and the second code, and backscatters the first code responsive to receiving a first command and the second code responsive to receiving a second command, the integrated circuit configured to:
cause a third command to be transmitted to the tag; and
receive, responsive to causing the third command to be transmitted, backscattered from the tag a combination made from at least portions of the first code, portions of the second code, and the at least one error-checking code, without causing any commands to be transmitted while the combination is being backscattered.

20. The IC of claim 19, wherein the second code includes at least one of a date of expiration of a host item that the tag is attached to, a date by which the host item is to be sold by, a date at which the host item was sold, a code for a sale of the host item, a receipt of the sale, an identifier for a retailer that made the sale, an identifier for a store through which the sale is made, an identifier for the tag, a password for the tag, a cryptographic quantity, a random number, an electronic signature, and an indicator for how a memory of the tag is configured.

* * * * *